(12) United States Patent
Futami et al.

(10) Patent No.: US 8,582,018 B2
(45) Date of Patent: Nov. 12, 2013

(54) IMAGING DEVICE, IMAGING METHOD, AND PROGRAM

(75) Inventors: Tsuyoshi Futami, Kanagawa (JP); Shinichi Ohtsubo, Kanagawa (JP); Atsushi Iwasaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 56 days.

(21) Appl. No.: 13/137,730

(22) Filed: Sep. 8, 2011

(65) Prior Publication Data

US 2012/0105707 A1 May 3, 2012

(30) Foreign Application Priority Data

Nov. 2, 2010 (JP) ................. 2010-246008

(51) Int. Cl.
*H04N 5/232* (2006.01)
*H04N 3/00* (2006.01)
*H04N 5/238* (2006.01)
*G03B 17/00* (2006.01)
*G06K 9/40* (2006.01)

(52) U.S. Cl.
USPC ........... 348/345; 348/346; 348/326; 348/353; 348/365; 396/79; 396/82; 396/89; 382/255

(58) Field of Classification Search
USPC ........... 348/345, 346, 365, 326, 353, 208.12, 348/806; 396/79, 80, 82, 89, 93, 102, 103, 396/104; 382/255

See application file for complete search history.

(56) References Cited

U.S. PATENT DOCUMENTS

| | | | | |
|---|---|---|---|---|
| 5,345,290 | A | * | 9/1994 | Watanabe et al. ............. 396/133 |
| 2007/0217023 | A1 | * | 9/2007 | Kim et al. ..................... 359/666 |
| 2009/0146602 | A1 | * | 6/2009 | Kikuchi et al. ............... 318/627 |

FOREIGN PATENT DOCUMENTS

JP 2009-169013 * 7/2009

* cited by examiner

*Primary Examiner* — Nhan T Tran
*Assistant Examiner* — Marly Camargo
(74) *Attorney, Agent, or Firm* — Sony Corporation

(57) ABSTRACT

An imaging device includes a detector that repeatedly carries out a series of operation of generating an evaluation value to evaluate the degree of focusing of a position after driving of a lens toward one end part in the drive range of the lens, and detects the evaluation value of a position that is closer to the end part than the position of the evaluation value of the highest degree of focusing and is immediately adjacent or adjacent across a predetermined number of positions to the position of the evaluation value of the highest degree of focusing. The imaging device further includes a drive controller that makes the series of operation be repeatedly carried out toward the other end part in the drive range of the lens, and drives the lens to a position of a degree of focusing not smaller than the detected evaluation value.

18 Claims, 16 Drawing Sheets

F I G . 2
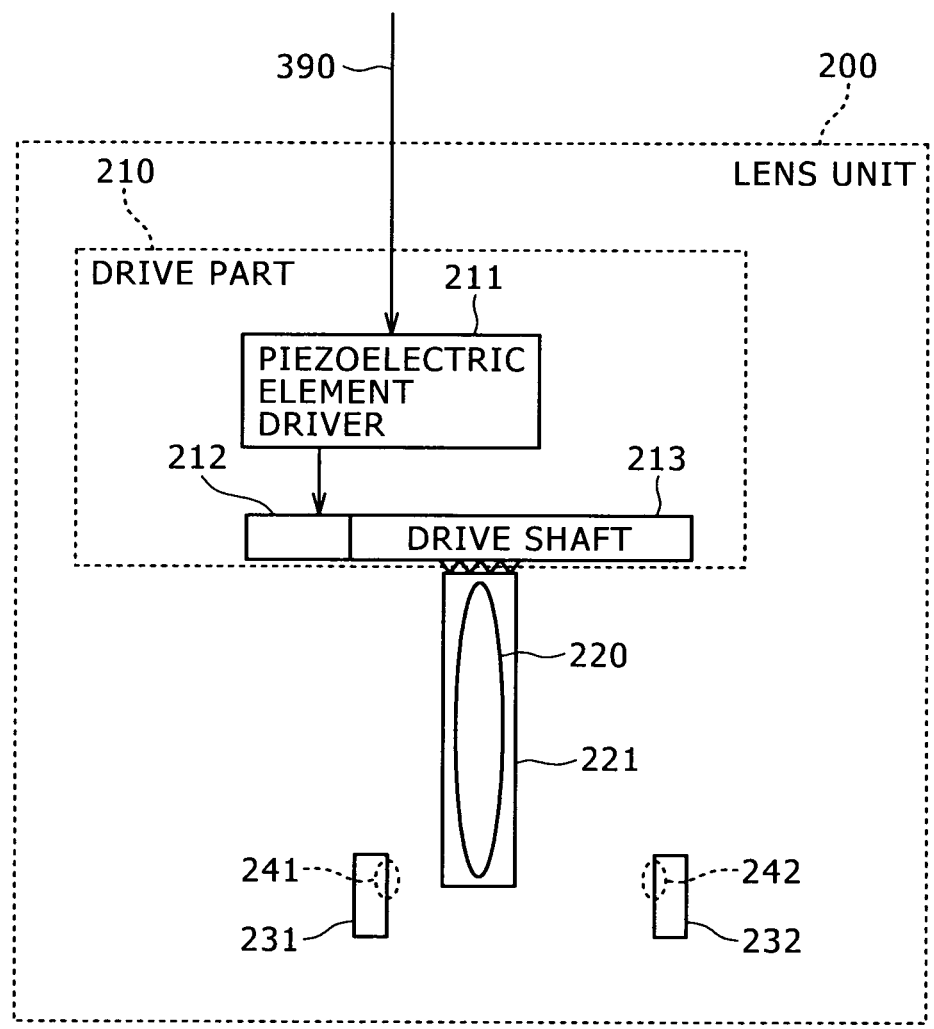

FIG.5A
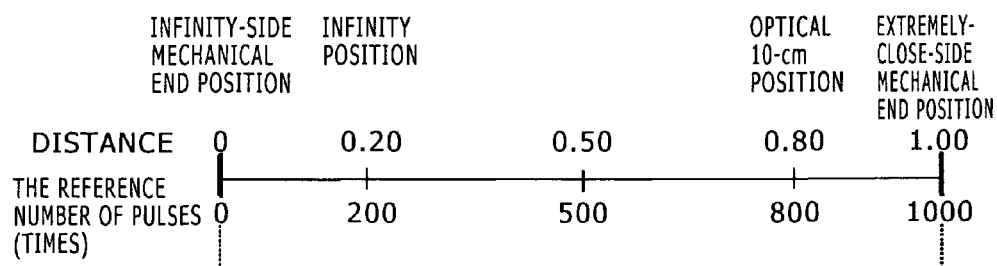
FIG.5B
FIG.5C
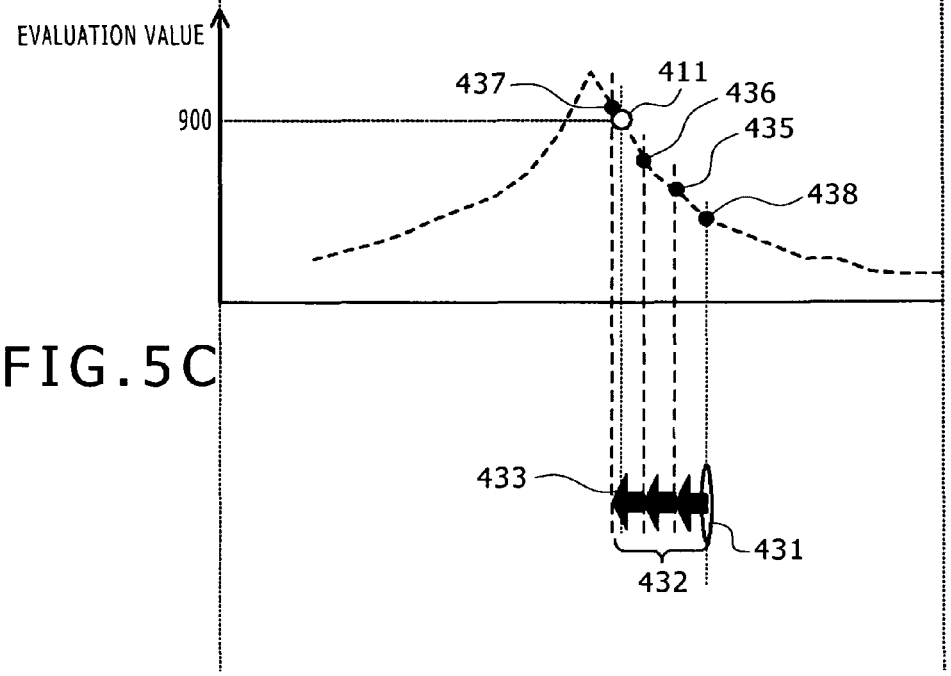

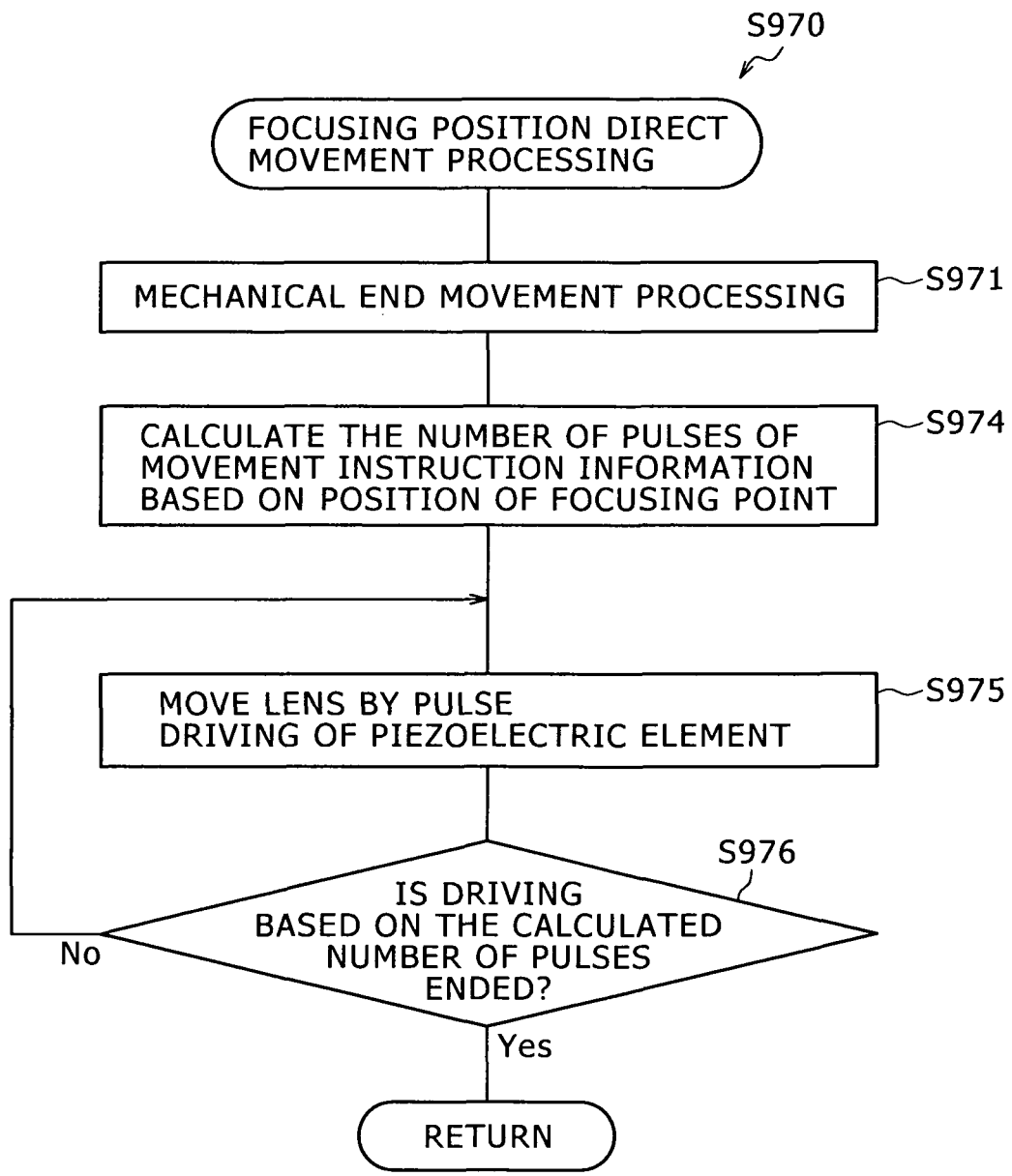

IMAGING DEVICE, IMAGING METHOD, AND PROGRAM

BACKGROUND

The present disclosure relates to imaging devices, and particularly to imaging device and imaging method to control driving of a lens and a program for causing a computer to carry out the method.

Imaging devices, such as digital still cameras, that perform imaging of a subject such as a person by using an imaging element to generate a taken image and record this generated taken image are prevalent. Furthermore, imaging devices having an autofocus function are widely prevalent. In addition, along with size reduction of the imaging element, optical system components, and so forth, portable information terminals equipped with these imaging devices (camera modules) are prevalent.

These portable information terminals are equipped with an actuator for moving the focus lens in the optical axis direction in order to realize the autofocus function. It is preferable that the amount of movement by this actuator linearly changes with respect to the applied voltage. However, it is becoming practical to use an element having the characteristic of hysteresis between the supplied voltage and the amount of movement of the focus lens (e.g. piezoelectric element) as the actuator for the purpose of reduction in the power consumption, size, and so forth of the actuator.

If an element having this hysteresis characteristic is used as the actuator, the accurate amount of movement is not obtained because an error occurs in the amount of movement. For this case, a focus control technique in which a position sensor of the focus lens is provided to thereby carry out feedback control to compensate the error and enhance the positioning accuracy is prevalent. However, providing the position sensor precludes size reduction of the imaging device and increases the cost. Thus, a device that uses the actuator having the hysteresis characteristic without a position sensor is being studied.

For example, as the imaging device including such an actuator, there has been proposed an imaging device that counts position information of the focus lens by using a counter counted depending on the supply time of a voltage supplied to a piezoelectric element and carries out positioning control of the focus lens (refer to e.g. Japanese Patent Laid-Open No. 2009-169013).

SUMMARY

In the above-described related art, positioning control of the focus lens can be carried out without providing a position detecting sensor of the focus lens.

However, in the above-described related art, the hysteresis characteristic of the amount of movement of the focus lens attributed to change in the use environments such as the temperature and the posture is not taken into consideration. Therefore, divergence (error) of the amount of movement occurs due to change in the use environments such as the temperature and the posture. Thus, possibly divergence occurs between the actual position of the focus lens and the position indicated by the value of the counter depending on the number of times of driving of the focus lens.

So, in the above-described related art, at the first timing in positioning control of autofocus operation, the focus lens is pressed against one mechanical end part to reset the position of the focus lens. Thus, the accurate position of the focus lens is grasped. Furthermore, when the focus lens is moved to the peak of the evaluation value in the autofocus operation, the focus lens is pressed against one mechanical end part again and then moved to the peak of the evaluation value. In this manner, in the case of pressing the focus lens against the mechanical end part, the focus lens is moved to the mechanical end part after being moved over the full stroke on the assumption that the position of the focus lens is unclear.

However, this full stroke movement takes a long time. Furthermore, the movement distance of the focus lens is long because the focus lens is moved to the peak of the evaluation value after being pressed against the mechanical end part again. That is, the time for the autofocus operation is long and the focus control cannot be rapidly carried out. Moreover, in the operation of moving the focus lens from the mechanical end part to the peak of the evaluation value, the amount of movement is calculated based on the amount of movement of the focus lens in detection of the evaluation value. Thus, the lens position is often divergent from the peak of the evaluation value due to the divergence of the amount of movement. That is, the accuracy of focusing often becomes low in the operation of moving the focus lens from the mechanical end part to the peak of the evaluation value. So, it is important to efficiently carry out the focus control when a position detecting sensor of the focus lens is not provided.

There is a need for a technique to efficiently carry out the focus control.

According to embodiments of the present disclosure, there are provided imaging device, imaging method, and program for causing a computer to carry out the method. The imaging device includes a detector configured to repeatedly carry out a series of operations of generating an evaluation value to evaluate the degree of focusing of a position after driving of a lens based on a drive instruction by a focus adjusting element that changes or adjusts the focal length depending on supplied power toward one end part in the drive range of the lens. The detector detects the evaluation value of a position that is closer to the end part than the position of the evaluation value of the highest degree of focusing and is immediately adjacent or adjacent across a predetermined number of positions to the position of the evaluation value of the highest degree of focusing. The imaging device further includes a drive controller configured to make the series of operations be repeatedly carried out toward the other end part in the drive range of the lens, and drive the lens to a position of a degree of focusing not smaller than the detected evaluation value based on the detected evaluation value. This provides an effect that the lens is driven to a position of a degree of focusing not smaller than the evaluation value of a position that is closer to the end part than the position of the evaluation value of the highest degree of focusing and is immediately adjacent or adjacent across a predetermined number of positions to the position of the evaluation value of the highest degree of focusing, based on this evaluation value.

In these embodiments, the drive controller may calculate the distance between a position at which repetition of the series of operations of generating the evaluation value is ended and the position of the evaluation value detected by the detector and drive the lens by the calculated distance based on error information relating to an error from the amount of driving of the lens by the focus adjusting element and the calculated distance, before repeatedly carrying out the series of operations in the opposite direction of the direction of the driving. This provides an effect that the lens is driven based on the distance between the position at which repetition of the series of operations of generating the evaluation value is ended and the position of the evaluation value detected by the detector and the error information. In this case, the error information may be first information relating to an error in the case in which the amount of driving of the lens by one time of driving by the focus adjusting element is the maximum due to posture difference of the imaging device, and second information relating to an error in the case in which the amount of driving of the lens by one time of driving by the focus adjusting element is the minimum due to the posture difference. In addition, the drive controller may calculate the number of times of driving by the focus adjusting element in the case in which the amount of driving relating to driving of the lens toward the one end part is the maximum and the amount of driving relating to driving of the lens toward the other end part is the minimum, based on the calculated distance, the first information, and the second information, and drive the lens the calculated number of times of driving. This provides an effect that the number of times of driving by the focus adjusting element in the case in which the amount of driving relating to driving of the lens toward one end part is the maximum and the amount of driving relating to driving of the lens toward the other end part is the minimum is calculated based on the distance, the first information, and the second information and the lens is driven the calculated number of times of driving.

In this case, the drive controller may repeatedly carry out the series of operations from a position after driving of the lens based on the calculated number of times of driving toward the other end part, and drive the lens to a position of a degree of focusing not smaller than the detected evaluation value. This provides an effect that the series of operations is repeatedly carried out from the position after the lens is driven the number of times of driving based on the distance, the first information, and the second information and the lens is driven to a position of a degree of focusing not smaller than the detected evaluation value.

In the above-described embodiments, the drive instruction relating to the series of operations repeatedly carried out toward the one end part may be a drive instruction for driving the focus adjusting element a predetermined number of times. In addition, the drive controller may drive the lens one time toward the other end part based on the drive instruction for driving the focus adjusting element a smaller number of times than the predetermined number of times, after repeatedly carrying out the series of operations toward the other end part. This provides an effect that the lens is driven one time toward the other end part based on the drive instruction for driving the focus adjusting element a smaller number of times than the predetermined number of times relating to the series of operations after the series of operations is repeatedly carried out toward the other end part.

In the above-described embodiments, the drive controller may calculate the distance between a position at which repetition of the series of operations of generating the evaluation value is ended and the position of the evaluation value detected by the detector and drive the lens by the calculated distance based on a threshold coefficient for considering posture difference in a predetermined environment and the calculated distance, before repeatedly carrying out the series of operations toward the other end part. This provides an effect that the distance between the position at which repetition of the series of operations of generating the evaluation value is ended and the position of the evaluation value detected by the detector is calculated and the lens is driven by the calculated distance based on the threshold coefficient and the calculated distance before the series of operations is repeatedly carried out toward the other end part.

In the above-described embodiments, the drive controller may drive the lens to the position of the evaluation value of the highest degree of focusing based on the distance between the position of the evaluation value of the highest degree of focusing and one end part of two end parts in the drive range of the lens after driving the lens to the one end part, if the drive controller fails to drive the lens to a position of a degree of focusing not smaller than the detected evaluation value by a predetermined number of times of repetition of the series of operations toward the other end part in the repetition of the series of operations. This provides an effect that the lens is driven to the position of the evaluation value of the highest degree of focusing after being driven to one end part of two end parts in the drive range of the lens if the lens cannot be driven to a position of a degree of focusing equal to higher than the detected evaluation value by the predetermined number of times of the repetition.

In the above-described embodiments, the lens may be a focus lens. This provides an effect that the position of the focus lens driven in autofocus operation is estimated in a lens barrel in which plural lenses are stored.

In the above-described embodiments, the focus adjusting element may be in contact with the lens with the intermediary of a drive shaft, and the focus adjusting element may drive the lens by using increase and decrease in friction force between the drive shaft and the lens due to repetition of expansion and contraction of the focus adjusting element in a specific direction with displacement speed change. This provides an effect that the lens is moved by using increase and decrease in friction force between the drive shaft and the lens due to the repetition of expansion and contraction of the focus adjusting element in the specific direction with displacement speed change.

In the above-described embodiments, the focus adjusting element may change or adjust the focal length through movement or deformation of the lens. This provides an effect that the focal length is changed or adjusted through movement or deformation of the lens.

In the above-described embodiments, the focus adjusting element may be a focus adjusting element of either a piezoelectric element or a shape-memory alloy. This provides an effect that the lens is driven by the piezoelectric element or the shape-memory alloy.

In the above-described embodiments, the focus adjusting element may be a liquid lens, an electrically-conductive polymer actuator, or a polymer resin material that is deformed depending on supplied power, and change or adjust the focal length through deformation of the lens. This provides an effect that the focal length is changed or adjusted by the liquid lens, the electrically-conductive polymer actuator, or the polymer resin material.

In the above-described embodiments, the drive controller may supply the drive instruction based on the amount of driving and drive direction with which the lens is driven. This provides an effect that the drive instruction is supplied based on the amount of driving and the drive direction with which the lens should be driven.

In the above-described embodiments, the drive controller may consider the posture of the imaging device as such posture of the imaging device that a specific direction corresponds with the horizontal plane, and estimate the-number-of-times information indicating the number of times of driving by the focus adjusting element equivalent to the distance from one end part of two end parts in the drive range of the lens as a position at which the lens exists based on the amount of driving of the lens by one time of drive operation by the focus adjusting element in the case in which the temperature of the focus adjusting element is a predetermined temperature. This provides an effect that the posture of the imaging device is considered as such posture of the imaging device that the specific direction corresponds with the horizontal plane and the-number-of-times information indicating the number of times of driving by the focus adjusting element equivalent to the distance from one end part of two end parts in the drive range of the lens is estimated as the position at which the lens exists based on the amount of driving of the lens by one time of drive operation by the focus adjusting element in the case in which the temperature of the focus adjusting element is a predetermined temperature.

According to another embodiment of the present disclosure, there is provided an imaging device including a detector configured to repeatedly carry out a series of operations of generating an evaluation value to evaluate the degree of focusing of a position after driving of a lens based on a drive instruction by a focus adjusting element toward one end part in the drive range of the lens, and detect an evaluation value serving as the basis of driving of the lens. The imaging device further includes a drive controller configured to drive the lens to the position of the detected evaluation value based on the distance between the position of the detected evaluation value and one end part of two end parts in the drive range of the lens after driving the lens to the one end part, if the drive controller fails to drive the lens to a position of a degree of focusing not smaller than the detected evaluation value by a predetermined number of times of repetition of the series of operations toward the other end part in the drive range of the lens in the repetition of the series of operations.

The embodiments of the present disclosure can provide an excellent effect that focus control can be efficiently carried out.

BRIEF DESCRIPTION OF THE DRAWINGS

FIG. 2 is a block diagram showing one example of the functional configuration of a lens unit in the first embodiment of the present disclosure;

FIGS. 5A to 5C are schematic diagrams showing one example of reverse-scan operation by the detector and the drive controller in the first embodiment of the present disclosure;

FIG. 16 is a flowchart showing a processing procedure example of focusing position direct movement processing in the autofocus operation of the second embodiment of the present disclosure.

DETAILED DESCRIPTION OF THE PREFERRED EMBODIMENTS

Modes for carrying out the present disclosure (hereinafter, referred to as embodiments) will be described below. The order of the description is as follows.

1. First Embodiment (imaging control: example in which skip operation is carried out on the assumption of the worst case)
2. Second Embodiment (imaging control: example in which skip operation is carried out with optimization to general use environment)

1. First Embodiment

[Functional Configuration Example of Imaging Device]

Figure 1:
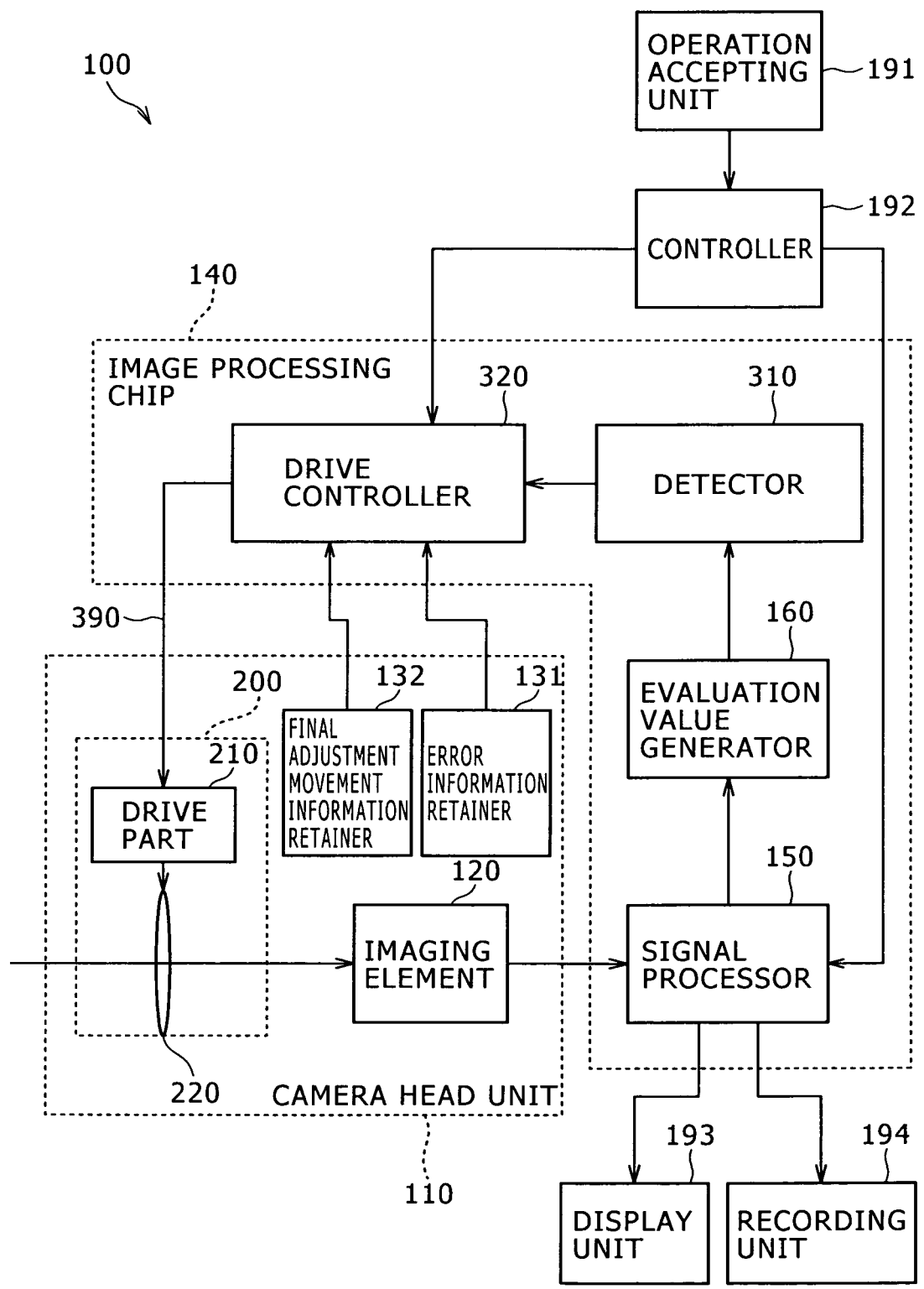
FIG. 1 is a block diagram showing one example of the functional configuration of an imaging device in a first embodiment of the present disclosure.

FIG. 1 is a block diagram showing one example of the functional configuration of an imaging device 100 in a first embodiment of the present disclosure. The imaging device 100 is an imaging device that performs imaging of a subject to generate image data and record the generated image data as image content (recorded image). This imaging device 100 controls the focus by carrying out autofocus operation of automatically focusing the object as the subject of focusing (focusing subject). With FIG. 1, an example of a camera module incorporated into a portable information terminal such as a smartphone and a cellular phone will be described.

The imaging device 100 includes a camera head unit 110, an image processing chip 140, an operation accepting unit 191, a controller 192, a display unit 193, and a recording unit 194.

The camera head unit 110 is composed of an imaging element and various kinds of optical components used to make light from a subject (subject light) incident on the imaging element. For example, this camera head unit 110 is realized as a lens module incorporated into a portable information terminal. This camera head unit 110 includes a lens unit 200, an imaging element 120, an error information retainer 131, and a final adjustment movement information retainer 132.

The lens unit 200 is to collect the subject light. In FIG. 1, a drive part 210 and a focus lens 220 are shown as the configuration in the lens unit 200. The lens unit 200 will be described later with reference to FIG. 2.

The drive part 210 drives the focus lens 220. In the first embodiment of the present disclosure, a piezoelectric element (piezo element) is used as the actuator for driving (moving) the focus lens 220. The drive part 210 moves the focus lens 220 in accordance with e.g. information relating to a movement instruction in movement of the position of the focus lens 220, calculated in the image processing chip 140 (movement instruction information). The movement instruction information is one example of the drive instruction set forth in the scope of claims.

The focus lens 220 is driven by the drive part 210 and thus its position is moved in the optical axis direction. In this manner, the focus is adjusted.

The imaging element 120 performs photoelectric conversion of subject light to an electrical signal, and receives the subject light to generate the electrical signal. The imaging element 120 is realized by e.g. a complementary metal oxide semiconductor (CMOS) sensor and a charge coupled device (CCD) sensor.

The error information retainer 131 retains information relating to the error in the movement distance (the amount of movement) of the focus lens 220 in driving of the focus lens 220 (error information). For example, if the actuator to move the focus lens 220 is a piezo element, difference arises in the movement distance (the amount of movement) by one time of expansion and contraction of the piezoelectric element (one time of pulse driving) due to change in the posture of the imaging device 100. If the focus lens 220 is moved in the direction toward which the gravity force goes (downward direction), the amount of movement is the largest. In contrast, if the focus lens 220 is moved in the opposite direction of the gravity force direction (upward direction), the amount of movement is the smallest. The error information retainer 131 retains information relating to the maximum amount and minimum amount of the movement distance by one time of expansion and contraction as the error information. The error information retained by the error information retainer 131 is used in e.g. skip operation in autofocus operation. The error information and the skip operation will be described later with reference to FIGS. 4A to 4C. The error information retainer 131 is mounted in e.g. the lens module incorporated into the portable information terminal, and is realized by a non-volatile memory (electrically erasable programmable read only memory (EEPROM)), a flash memory, a magnetoresistive random access memory (MRAM), etc. in which e.g. factory adjustment values for adjustment to a certain standard through measurement of the characteristics of this lens module, particularly individual variation, are recorded. The error information retainer 131 supplies the retained error information to a drive controller 320.

The final adjustment movement information retainer 132 retains final adjustment movement information as information relating to the amount of movement (the number of pulses) in final adjustment operation of the focus lens 220. The final adjustment operation refers to operation in which the lens is moved by a certain amount uniformly for enhancing the focusing accuracy after being moved to a position of an evaluation value equal to or higher than the evaluation value as the target of the lens position in the autofocus operation. The final adjustment movement information retained by the final adjustment movement information retainer 132 will be described later with reference to FIGS. 6A and 6B. The final adjustment movement information retainer 132 is realized by a non-volatile memory mounted in the lens module incorporated into the portable information terminal similarly to the error information retainer 131. The final adjustment movement information retainer 132 supplies the retained final adjustment movement information to the drive controller 320.

The image processing chip 140 is to control the respective operations in the camera head unit 110 and generate an image. For example, this image processing chip 140 is realized as an image signal processor (ISP) incorporated into the portable information terminal. This image processing chip 140 includes a signal processor 150, an evaluation value generator 160, a detector 310, and the drive controller 320.

The signal processor 150 executes various kinds of signal processing for an electrical signal supplied from the imaging element 120. This signal processor 150 executes sampling processing, development processing, YC separation processing (luminance signal and chrominance signal), and so forth for the electrical signal supplied from the imaging element 120, to generate data of a still image (image data). The signal processor 150 supplies this generated image data to the display unit 193 and the recording unit 194.

Furthermore, the signal processor 150 supplies data used for focus detection by a contrast detection system to the evaluation value generator 160. The focus detection by a contrast detection system is a focus detection system in which images are taken with sequential slight movement of the focus lens and the position at which the image having the highest contrast is taken is determined to be the focusing position. For example if the evaluation value generator 160 generates the evaluation value by using a luminance signal (Y), the signal processor 150 supplies the luminance signal (Y) to the evaluation value generator 160.

The evaluation value generator 160 generates a value (evaluation value) indicating the degree of focusing on the object of the subject of focusing (focusing subject) based on the data that is supplied from the signal processor 150 and used for focus detection (luminance signal (Y)). For example, this evaluation value generator 160 extracts the luminance signal (Y) equivalent to the area including the focusing subject and calculates the evaluation value from this extracted luminance signal (Y). The evaluation value generator 160 supplies the calculated evaluation value to the detector 310.

The detector 310 detects the evaluation value as the target of lens movement (target evaluation value) in the scan operation in the autofocus operation based on the evaluation value supplied from the evaluation value generator 160. The scan operation will be described below. In the scan operation in the imaging device of the related art, the focus lens is moved step by step (by a predetermined number of pulses in every movement) and the position of the evaluation value of the highest degree of focusing is detected as the target evaluation value. In this case, in operation of moving the focus lens to the focusing position after the detection of the target evaluation value (equivalent to reverse-scan operation of the first embodiment of the present disclosure, which will be described later), the focus lens often passes through the focusing position due to a movement error attributed to the influence of the posture and the temperature. So, in the first embodiment of the present disclosure, in order to avoid the passage through the focusing position, the detector 310 detects, as the target evaluation value, the evaluation value of the position that is closer to the movement destination side than the position of the evaluation value of the highest degree of focusing and is immediately adjacent to the position of the evaluation value of the highest degree of focusing by the scan operation. This is for the purpose of preventing the lens from passing through the focusing position in the reverse-scan operation to be described later by detecting the evaluation value of this immediately adjacent position as the target evaluation value. Details of this scan operation will be described later with reference to FIGS. 3A to 3C. The detector 310 retains the target evaluation value in association with the lens position at which this target evaluation value is detected.

Furthermore, in the reverse-scan operation in the autofocus operation, the detector 310 detects whether or not the evaluation value supplied from the evaluation value generator 160 is equal to or higher than the target evaluation value detected in the scan operation. The reverse-scan operation is operation of moving the focus lens 220 with sequential detection as to whether or not the evaluation value of the position of the focus lens 220 is equal to or higher than the target evaluation value after the target evaluation value is detected in the scan operation. Details of this reverse-scan operation will be described later with reference to FIGS. 5A to 5C.

The drive controller 320 supplies the movement instruction information to the drive part 210 to thereby control the movement (driving) of the position of the focus lens 220 in the autofocus operation. The autofocus operation controlled by the drive controller 320 will be described below. First, when being supplied with autofocus start information from the controller 192, the drive controller 320 moves the focus lens 220 to an end part of the movable range of the focus lens 220, which is a position that allows ensured finding of the position of the focus lens 220. Furthermore, the drive controller 320 moves the lens to the scan start position and then sequentially moves the focus lens 220 by a predetermined number of pulses in every movement until the detector 310 detects the target evaluation value (scan operation).

Subsequently, when the target evaluation value is detected, the drive controller 320 moves the focus lens 220 from the end position of the scan operation with an aim of the position of the target evaluation value based on the error information and the lens position at which the target evaluation value is detected (skip operation). After the skip operation, the drive controller 320 sequentially moves the focus lens 220 by a predetermined number of pulses in every movement while making the detector 310 detect whether or not the evaluation value of the position of the focus lens 220 is equal to or higher than the target evaluation value (reverse-scan operation). Subsequently, the drive controller 320 moves the focus lens 220 one time by a smaller amount of movement than the amount of one-time movement in the scan operation based on the final adjustment movement information supplied from the final adjustment movement information retainer 132, to bring the focus lens 220 closer to the focusing position from the end position of the reverse-scan operation (final adjustment operation). These respective operations will be described later with reference to FIG. 3A to FIG. 6B.

The operation accepting unit 191 accepts operation from the user. For example if a shutter button (not shown) is pressed down, this operation accepting unit 191 supplies a signal relating to this pressing-down (imaging instruction operation) as an operation signal to the controller 192.

The controller 192 controls the operation of the respective units in the imaging device 100. For example if the shutter button is pressed down and the operation signal for starting recording of a still image is accepted, this controller 192 supplies information relating to execution of recording of a still image (still-image taking operation information) to the signal processor 150 in the image processing chip 140. Furthermore, in the case of starting the autofocus operation of automatically focusing the focusing subject, the controller 192 supplies information relating to the start of the autofocus operation (autofocus start information) to the drive controller 320.

The display unit 193 displays an image based on image data supplied from the signal processor 150. This display unit 193 is realized by e.g. a color liquid crystal panel.

The recording unit 194 records image data supplied from the signal processor 150 as image content (image file). For example, as this recording unit 194, a removable recording medium (one or plural recording media) typified by a disk such as a digital versatile disk (DVD) and a semiconductor memory such as a memory card can be used. These recording media may be included into the imaging device 100 as built-in media or may be detachable from the imaging device 100.

[Functional Configuration Example of Lens Unit]

FIG. 2 is a block diagram showing one example of the functional configuration of the lens unit 200 in the first embodiment of the present disclosure.

The lens unit 200 includes the drive part 210, the focus lens 220, a lens barrel 221, a stopper 231, and a stopper 232.

The drive part 210 drives the focus lens 220 as shown in FIG. 1 and includes a piezoelectric element driver 211, a piezoelectric element 212, and a drive shaft 213.

The piezoelectric element driver 211 supplies a drive voltage to the piezoelectric element 212 based on the movement instruction information supplied from the drive controller 320 via a signal line 390. The piezoelectric element driver 211 supplies the drive voltage as a pulse and makes the piezoelectric element 212 perform expansion and contraction with displacement speed change so that the focus lens 220 may move in the movement direction indicated by the movement instruction information. The number of times of expansion and contraction indicated by the movement instruction information supplied from the drive controller 320 is directly proportional to the number of pulses of the drive voltage. The first embodiment of the present disclosure is based on the assumption that the number of times of expansion and contraction indicated by the movement instruction information is the same as the number of pulses of the drive voltage, for convenience of description.

The piezoelectric element 212 is an actuator that moves the focus lens 220 by repeating expansion and contraction with displacement speed change. This piezoelectric element 212 is an element in which displacement occurs when a voltage is applied (piezo element). One end of the piezoelectric element 212 is fixed to a holder (not shown) of the lens unit 200 and the drive shaft 213 is attached to the other end. The piezoelectric element 212 repeats expansion and contraction in the optical axis direction of the lens (left and right directions in the diagram) to thereby push and pull the drive shaft 213 in the optical axis direction of the lens. That is, the piezoelectric element 212 is an element capable of varying the lens position. Difference arises in the expansion length of the piezoelectric element 212 due to temperature difference. The first embodiment of the present disclosure is based on the assumption that only the influence of the temperature exists, for convenience of description. The piezoelectric element 212 is one example of the focus adjusting element set forth in the scope of claims.

The drive shaft 213 moves the position of the focus lens 220 in accordance with the expansion/contraction operation of the piezoelectric element 212. This drive shaft 213 is in contact with a moving body (lens barrel 221) and frictionally keeps the position of the focus lens 220 held by the lens barrel 221 by friction between the drive shaft 213 and the lens barrel 221. When the piezoelectric element 212 suddenly expands or contracts, the friction surfaces between the lens barrel 221 and the drive shaft 213 slip and the drive shaft 213 makes the lens barrel 221 remain at substantially the same position. When the piezoelectric element 212 slowly expands or contracts, the drive shaft 213 makes the lens barrel 221 be also moved together by friction between the lens barrel 221 and the drive shaft 213. Through the repetition of these actions, the drive shaft 213 moves the position of the focus lens 220.

The focus lens 220 moves in the optical axis direction to thereby adjust the focus as shown in FIG. 1.

The lens barrel 221 is a component to which the focus lens 220 is attached, and moves and keeps the position of the focus lens 220 by using friction with the drive shaft 213. The focus lens 220 and the lens barrel 221 are one example of the lens set forth in the scope of claims.

The stopper 231 and the stopper 232 are mechanical stoppers to limit the movable range of the lens barrel 221 and the focus lens 220 in the optical axis direction. That is, the stopper 231 and the stopper 232 serve as mechanical end parts (mechanical ends) at both ends of the movable range of the focus lens 220 in the optical axis direction. The distance between the stopper 231 and the stopper 232 is equal to the maximum movable distance of the focus lens 220. In the embodiments of the present disclosure, the contact position with the lens barrel 221 in the stopper 231 will be referred to as the extremely-close-side mechanical end (extremely-close-side mechanical end 241) and the contact position with the lens barrel 221 in the stopper 232 will be referred to as the infinity-side mechanical end (infinity-side mechanical end 242).

[Scan Operation Example]

Figure 3A:
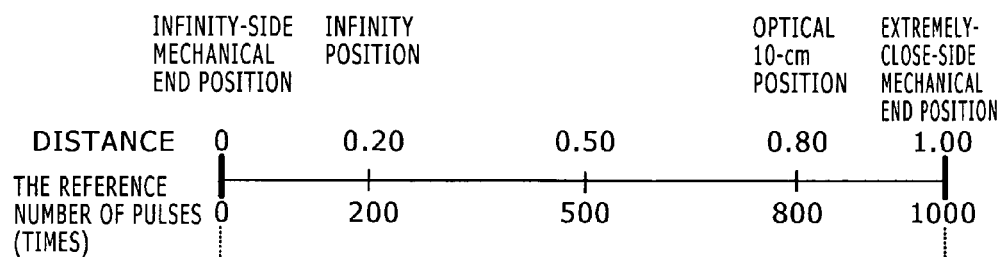
FIGS. 3A to 3C are schematic diagrams showing one example of scan operation by a detector and a drive controller in the first embodiment of the present disclosure.
Figure 3B:
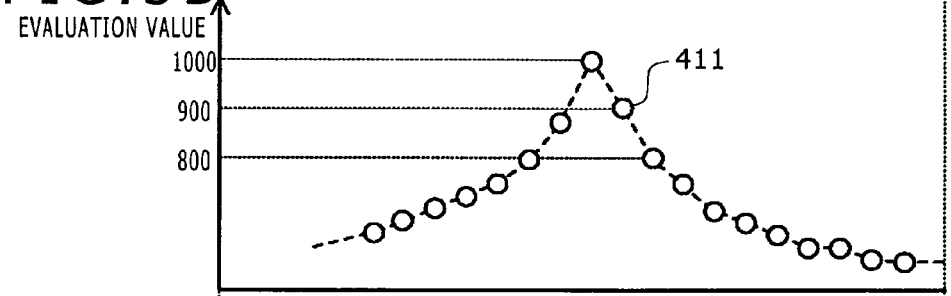
Figure 3C:
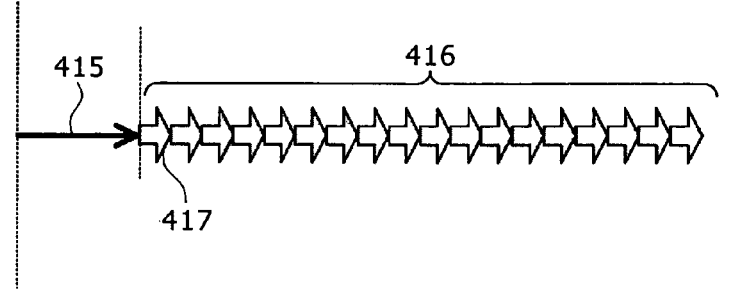

FIGS. 3A to 3C are schematic diagrams showing one example of the scan operation by the detector 310 and the drive controller 320 in the first embodiment of the present disclosure.

In FIG. 3A, the distance of the leg between the infinity-side mechanical end and the extremely-close-side mechanical end as the movement leg of the focus lens 220 is schematically shown in the abscissa direction.

In FIG. 3A, the distance between the infinity-side mechanical end and the extremely-close-side mechanical end is represented by a relative value of 0 to 1.00, with the position of the infinity-side mechanical end defined as "0." Furthermore, the distance between the infinity-side mechanical end and the extremely-close-side mechanical end is represented by the number of times of driving of the focus lens 220 (the reference number of pulses) in the case in which the imaging device 100 is used under the use environment serving as the basis, with the position of the infinity-side mechanical end defined as "0."

As the use environment serving as the basis (basic use environment), an environment (temperature, posture) under which generally the imaging device 100 is used most frequently is set (e.g. state in which the temperature is an ordinary temperature of 25 degrees and the horizontal plane is parallel to the movement direction of the focus lens 220 (optical axis direction)). The embodiments of the present disclosure are based on the assumption that the movement distance of the focus lens 220 is "0 to 1000" in the reference number of pulses.

The distance shown in FIG. 3A corresponds to the abscissa of each of FIG. 3B and FIG. 3C.

In FIG. 3B, the evaluation value detected by the scan operation is schematically shown in such a manner that the ordinate is used as the axis showing the evaluation value and the abscissa is used as the axis showing the movable leg of the focus lens 220 similarly to FIG. 3A. In FIG. 3B, the evaluation values generated by the scan operation are indicated by the white circles. As shown in FIG. 3B, the first embodiment of the present disclosure is based on the assumption that the evaluation values at 18 positions are generated by the scan operation. Furthermore, a target point 411 as the evaluation value of the detection object in the scan operation is shown in FIG. 3B.

The target point 411 is the evaluation value generated next to the highest evaluation value and the position of this evaluation value. The detector 310 carries out the scan operation in order to detect (find) this target point 411.

In FIG. 3C, the operation of the focus lens 220 (lens) from the start of the autofocus operation to the end of the scan operation is schematically shown, with the abscissa used similarly to FIG. 3A. Specifically, in FIG. 3C, an arrow (start position movement 415) indicating the movement of the lens from the infinity-side mechanical end position to the scan start position and plural arrows (scan movement 416) indicating the movement of the lens from the scan start to the end are shown. Furthermore, in FIG. 3C, plural arrows (scan movement one step 417) each indicating one-time movement in the scan operation (movement based on one piece of movement instruction information) are shown in the scan movement 416.

The operation of the detector 310 and the drive controller 320 from the start of the autofocus operation to the end of the scan operation will be described below.

First, the drive controller 320 brings the lens into contact with the infinity-side mechanical end at the start of the autofocus operation. Thus, the value of lens position information indicating the lens position is initialized to a value of "0." Then the drive controller 320 moves the lens to the scan start position. For example, suppose that the scan start position is the position resulting from movement from the position of the infinity-side mechanical end toward the extremely-close side by 200 times of expansion and contraction under the basic use environment. In this case, the drive controller 320 supplies the drive part 210 with the movement instruction information in which information indicating the number of pulses is "200" and the movement direction is the direction toward the extremely-close side. Furthermore, the drive controller 320 updates the lens position information to the position of the movement destination based on the supplied movement instruction information (adds a value of "200" to "0").

After the movement to the scan start position, the scan operation of sequentially detecting the evaluation value while sequentially moving the lens by a predetermined number of pulses in every movement is carried out. In this scan operation, a series of operations of moving the lens by the predetermined number of pulses (e.g. 40 pulses) in the direction toward the extremely-close side and then calculating the evaluation value based on an image taken by the imaging element 120 is repeatedly carried out. In association with this movement, the lens position information is updated (for example a value of "40" is added to "200") and the detector 310 retains the evaluation value associated with the lens position information.

By this scan operation, the evaluation value and lens position information of the position resulting from one time of scan from the position of the highest evaluation value are detected.

[Skip Operation Example]

Figure 4A:
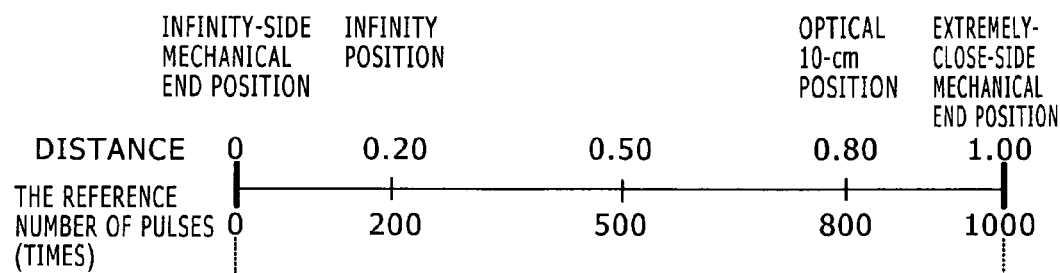
FIGS. 4A to 4C are schematic diagrams showing one example of skip operation by the detector and the drive controller in the first embodiment of the present disclosure.
Figure 4B:
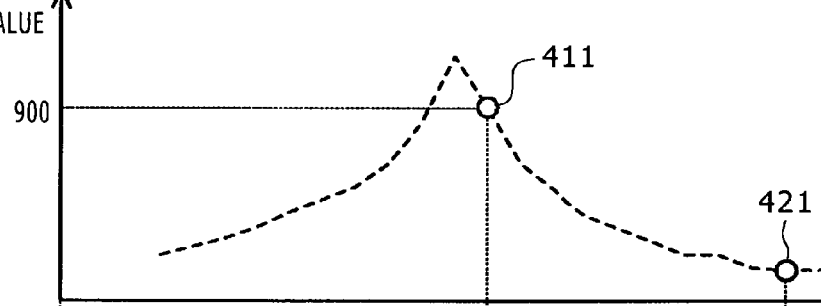
Figure 4C:
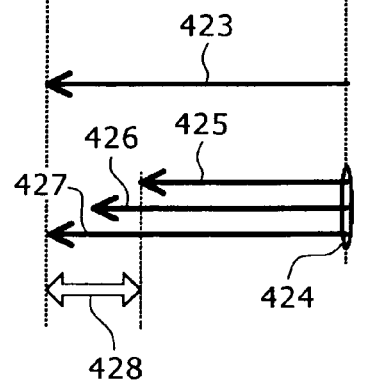

FIGS. 4A to 4C are schematic diagrams showing one example of the skip operation by the detector 310 and the drive controller 320 in the first embodiment of the present disclosure.

In FIG. 4A, the distance of the leg between the infinity-side mechanical end and the extremely-close-side mechanical end as the movement leg of the focus lens 220 is schematically shown in the abscissa direction. FIG. 4A is the same as FIG. 3A and therefore description thereof is omitted.

In FIG. 4B, the target point 411 shown in FIG. 3B is shown in such a manner that the ordinate is used as the axis showing the evaluation value and the abscissa is used as the axis showing the movable leg of the focus lens 220 similarly to FIG. 4A. Furthermore, in FIG. 4B, the white circle indicating the last evaluation value generated in the scan operation (scan end point 421) is shown.

In FIG. 4C, one example of the method for calculating the number of pulses relating to the movement instruction information for instruction of the skip operation is schematically shown, with the abscissa used similarly to FIG. 4A.

In FIG. 4C, a scan end position 424 as the lens position at the scan end is shown. Furthermore, in FIG. 4C, the amount of movement (the necessary amount 423 of movement) necessary to move the lens located at the scan end position (scan end position 424) to the scan target position (target point 411) is shown. Moreover, the amount of movement (the minimum amount 425 of movement) when the movement distance of the lens based on the movement instruction information relating to the skip operation is the minimum and the amount of movement (the maximum amount 427 of movement) when the movement distance of the lens is the maximum are shown. In addition, the amount of movement (the instructed amount 426 of movement) when the movement distance of the lens based on the movement instruction information relating to the skip operation is the basic distance (as instructed) is shown. Furthermore, the range (estimated lens position range 428) of the position at which the focus lens 220 is estimated to exist after movement based on the movement instruction information relating to the skip operation is shown.

The skip operation in the autofocus operation will be described below.

After the end of the scan operation, the detector 310 and the drive controller 320 start operation for moving the lens to the focusing position. As this movement method, generally a method of moving the lens based on the movement distance from the focusing position to the scan end position in the scan operation will be available. If a piezoelectric element is the actuator, this movement method can be realized by providing a position sensor of the lens because an error exists in the movement distance (the amount of movement) of the lens by one time of expansion and contraction (one time of pulse driving) of the piezoelectric element. However, in the imaging device 100 of the embodiment of the present disclosure, a position sensor is not provided and thus it is difficult to move the lens to the focusing position by using this movement method.

So, in the imaging device 100, first the lens is moved by using the number of pulses for movement across the distance from the scan end position (scan end point 421) to the position (target point 411) resulting from one time of scan from the position of the highest evaluation value in the case in which the largest error occurs. Thereafter, the imaging device 100 moves the focus lens 220 in the opposite direction of the scan direction with sequential detection as to whether or not the evaluation value of the lens position is equal to or higher than the target evaluation value (reverse-scan operation). After the lens is moved to a position of an evaluation value equal to or higher than the target evaluation value, the imaging device 100 moves the lens by a certain amount uniformly for enhancing the focusing accuracy (final adjustment operation). That is, the imaging device 100 regards the distance from the scan end position (scan end point 421) to the position (target point 411) resulting from one time of scan from the position of the highest evaluation value as the range in which detection of the evaluation value is unnecessary, and carries out the skip operation of skipping the reverse-scan operation.

Subsequently, the method for calculating the number of pulses of the movement instruction information relating to the skip operation will be described below.

Regarding the movement from the scan end point 421 to the target point 411 in the skip operation, the drive controller 320 sets the number of pulses of the movement instruction information in such a manner that the lens does not pass through the scan target position (target point 411) under any use condition. The case in which the lens passes through the scan target position to the maximum extent by a small number of pulses (worst case) is the case in which the movement direction of the lens in the scan operation is the opposite direction of the gravity force direction (upward direction) and the movement direction of the lens in the skip operation is the direction toward which the gravity force goes (downward direction). That is, by calculating such a number of pulses that the lens does not pass through the scan target position in the worst case, the drive controller 320 can generate such movement instruction information that the lens does not pass through the target point 411 under any use condition.

The number (P) of pulses of the movement instruction information relating to this skip operation is calculated by using e.g. the following Equation 1.

$$P = A \times U \times S \qquad \text{Equation 1}$$

In this equation, A is the value indicating the distance (the amount of movement) between the scan end position and the skip target position based on the reference number of pulses. The amount A of movement is indicated as the arrow (the necessary amount 423 of movement) extended from the scan end position 424 to the target point 411 in FIG. 4C. U is a coefficient (in-ascent posture difference variation ratio) obtained from the variation ratio between the amount of movement when the movement direction of the lens is the opposite direction of the gravity force direction (upward direction) and the amount of movement under the basic use environment. S is a coefficient (in-descent posture difference variation ratio) obtained from the variation ratio between the amount of movement when the movement direction of the lens is the gravity force direction (downward direction) and the amount of movement under the basic use environment. As shown by this Equation 1, variation in the amount of movement due to temperature difference is not considered in the calculation of the number P of pulses of the movement instruction information relating to the skip operation. This is for the following reason. The scan operation and the skip operation are control carried out in a very short time and temperature change in the processing time is substantially ignorable. Therefore, there is no need to consider the temperature characteristics in the calculation of the number of pulses as the amount of skip movement.

For example, suppose that errors up to ±20% relative to the amount of movement with the basic posture occur due to change in the posture of the imaging device 100 (error is −20% when the movement direction of the lens is the opposite direction of the gravity force direction (upward direction) and is +20% when the movement direction is the gravity force direction (downward direction)). The in-ascent posture difference variation ratio U in this case is a value of "1 (100%)−0.2 (20%)" (0.8), and the in-descent posture difference variation ratio S in this case is a value of "1 (100%)−0.2 (20%)" (0.8). In the error information retainer 131, "0.2" is retained as the error information relating to the case in which the movement distance is the maximum (movement direction is the gravity force direction (downward direction)) and "0.2" is retained as the error information relating to the case in which the movement distance is the minimum (movement direction is the opposite direction of the gravity force direction (upward direction)).

In this manner, the number of pulses of the movement instruction information relating to the skip operation is calculated based on the amount of movement between the scan end position and the skip target position, the in-ascent posture difference variation ratio, and the in-descent posture difference variation ratio. In the case of this calculated number of pulses, the lens does not pass through the scan target position even in the worst case as shown by the maximum amount 427 of movement in FIG. 4C. Furthermore, in a case other than the worst case, the lens can be moved to a position closer to the extremely-close side than the scan target position as shown by the minimum amount 425 of movement and the instructed amount 426 of movement in FIG. 4C. That is, the lens can be moved into the range indicated by the estimated lens position range 428 by skip movement based on the calculated number of pulses. As shown by the estimated lens position range 428, the lens position immediately after the skip operation is shifted from the skip target position (target point 411) toward the extremely-close side depending on the use environment. So, after the skip operation, the reverse-scan operation of sequentially detecting the evaluation value while sequentially moving the lens by a predetermined number of pulses in every movement in the opposite direction of the direction of the scan operation (direction toward the infinity side) is carried out to move the lens to a position of an evaluation value equal to or higher than the evaluation value of the target point 411.

[Reverse-Scan Operation Example]

FIGS. 5A to 5C are schematic diagrams showing one example of the reverse-scan operation by the detector 310 and the drive controller 320 in the first embodiment of the present disclosure.

In FIG. 5A, the distance of the leg between the infinity-side mechanical end and the extremely-close-side mechanical end as the movement leg of the focus lens 220 is schematically shown in the abscissa direction. FIG. 5A is the same as FIG. 3A and therefore description thereof is omitted.

In FIG. 5B, the scan target position (target point 411) shown in FIG. 3B is shown in such a manner that the ordinate is used as the axis showing the evaluation value and the abscissa is used as the axis showing the movable leg of the focus lens 220 similarly to FIG. 5A. Furthermore, in FIG. 5B, the evaluation value generated at the skip end position (skip end position evaluation value 438) and the evaluation values generated by the reverse-scan operation (first-round reverse-scan evaluation value 435, second-round reverse-scan evaluation value 436, and third-round reverse-scan evaluation value 437) are shown.

In FIG. 5C, the operation of the focus lens 220 (lens) from the start of the reverse-scan operation to the end is schematically shown, with the abscissa used similarly to FIG. 5A. Specifically, in FIG. 5C, the lens position at the end timing of the skip operation (skip end position 431) and plural arrows (reverse-scan movement 432) indicating the lens movement from the start of the reverse-scan operation to the end are shown. Furthermore, in FIG. 5C, plural (three) arrows (reverse-scan movement one step 433) each indicating one-time movement in the reverse-scan operation (movement based on one piece of movement instruction information) are shown in the reverse-scan movement 432.

The reverse-scan operation will be described below. The lens position at the end timing of the skip operation is closer to the extremely-close side than the target point 411 in most cases. However, the focusing position is near the position of the evaluation value that is immediately adjacent to the target point 411 and is closer to the infinity side than the target point 411. Therefore, the lens should be moved from the position at the end timing of the skip operation to a position near the focusing position. So, after the end of the skip operation, first the detector 310 and the drive controller 320 detect the evaluation value at the end position of the skip operation (skip end position evaluation value 438) and check whether the lens has been moved to the position of the target point 411. If the lens position is closer to the extremely-close side than the target point 411, the reverse-scan operation is carried out, i.e. a series of operations of detecting the evaluation value while sequentially moving the lens by a predetermined number of pulses in every movement is repeated, in order to move the lens to the vicinity of the target point 411. In the first embodiment of the present disclosure, the amount of movement of the lens (the predetermined number of pulses) in the reverse-scan operation is smaller than the amount of movement (the predetermined number of pulses) in the scan operation because the target point 411 detected in the scan operation should be sought with a small movement pitch.

This reverse-scan operation is ended at the timing when an evaluation value higher than the evaluation value of the target point 411 is detected. By using not the highest evaluation value but the evaluation value of the target point 411 as the basis, the passage of the lens through the focusing position in the reverse-scan operation is avoided. FIG. 5B shows an example in which an evaluation value (third-round reverse-scan evaluation value 437) slightly higher than the evaluation value of the target point 411 is detected due to the third-round movement in the reverse-scan operation.

In this manner, the lens is moved to a position of an evaluation value equal to or higher than the evaluation value of the target point 411 by the reverse-scan operation.

[Final Adjustment Operation Example]

Figure 6A:
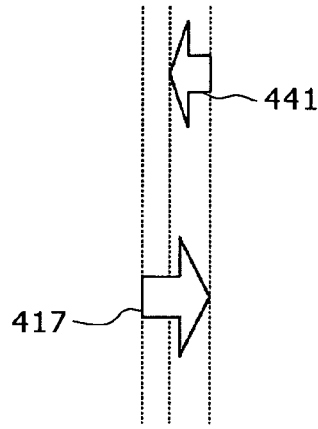
FIGS. 6A and 6B are schematic diagrams showing one example of final adjustment operation by the detector and the drive controller in the first embodiment of the present disclosure.
Figure 6B:
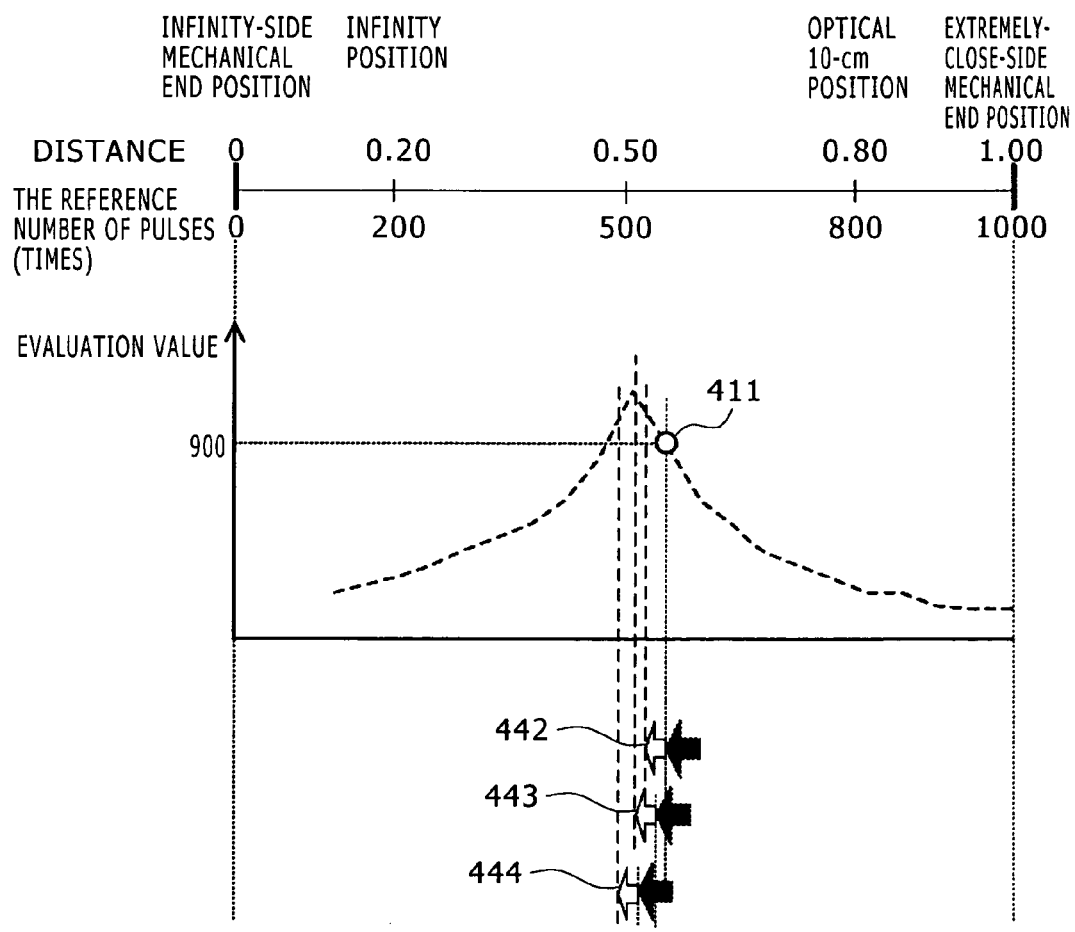

FIGS. 6A and 6B are schematic diagrams showing one example of the final adjustment operation by the detector 310 and the drive controller 320 in the first embodiment of the present disclosure.

In FIG. 6A, the amount of movement by the final adjustment operation is schematically shown. Specifically, in FIG. 6A, the scan movement one step 417 shown in FIG. 3C and an arrow (final adjustment one step 441) indicating movement by the final adjustment operation (movement based on one piece of movement instruction information) are shown.

As shown in FIGS. 6A and 6B, in the final adjustment operation, the lens is moved by a smaller amount of movement (smaller number of pulses) than the amount of one-time movement in the scan operation.

The amount of movement in the final adjustment operation (final adjustment one step 441) is decided in advance in individual adjustment at the manufacturing stage and is retained in the final adjustment movement information retainer 132 as the final adjustment movement information (e.g. ratio to the amount of movement in the scan operation).

In FIG. 6B, one example of lens movement by the final adjustment operation is schematically shown. Specifically, in FIG. 6B, the distance and the evaluation value of the target point 411 are shown similarly to FIGS. 4A and 4B. Furthermore, in FIG. 6B, an arrow (final adjustment 442) indicating movement by the final adjustment operation in the case in which the lens is moved to the same position as the target point 411 by the reverse-scan operation is shown. In addition, arrows (final adjustment 443 and final adjustment 444) each indicating movement by the final adjustment operation in the case in which the lens is moved to a position closer to the infinity side than the target point 411 by the reverse-scan operation are shown. The final adjustment 444 indicates movement by the final adjustment operation in the case in which the lens is moved to a position closer to the infinity side than in the case of the final adjustment 443 by the reverse-scan operation.

The final adjustment operation will be described below. As shown in FIG. 6B, the target point 411 is immediately adjacent, in the scan direction, to the position of the highest evaluation value detected in the scan operation (highest evaluation value position). That is, the focusing position is not near the target point 411 but near the highest evaluation value position. The highest evaluation value position is the position of the evaluation value detected in the scan operation. Because a position sensor is not provided, it is unclear whether the complete focusing position (position of the maximum evaluation value) is the same as the highest evaluation value position or slightly shifted toward the infinity side or the extremely-close side. Because of such a state and the characteristic that the lens position immediately after the reverse-scan operation exists between the highest evaluation value position and the target point 411, there is a possibility that the lens can be moved to a position of a higher degree of focusing by bringing the lens closer to the highest evaluation value position.

So, in the final adjustment operation, the lens is moved only one time in the same direction as that of the reverse-scan operation with a smaller amount of movement (final adjustment one step 441 in FIG. 6A) than the amount of movement in the scan operation (scan movement one step 417 in FIG. 6A). This can move the lens to a position of a higher evaluation value if the lens position immediately after the reverse-scan operation is close to the target point 411.

In the case in which the lens position immediately after the reverse-scan operation is close to the highest evaluation value position, the lens can be moved to a position of a higher evaluation value if the complete focusing position is slightly shifted from the highest evaluation value position toward the infinity side. In this case, if the complete focusing position is slightly shifted from the highest evaluation value position toward the extremely-close side, possibly the lens is moved to a position of a slightly-lower evaluation value. However, because the lens is moved with a smaller amount of movement than the amount of movement in the scan operation, the lens is not moved to the detection position that is immediately adjacent, in the reverse-scan direction, to the highest evaluation value position and thus divergence from the focusing position is small. That is, even when the lens position immediately after the reverse-scan operation is close to the highest evaluation value position, the possibility that the degree of focusing can be enhanced by the final adjustment operation is high.

In this manner, by carrying out the final adjustment operation after the reverse-scan operation, the lens can be moved to the highest evaluation value position, which is the final focusing position, and the focusing accuracy can be enhanced.

[Examples of Lens Movement after Scan Operation]

Figure 7A:
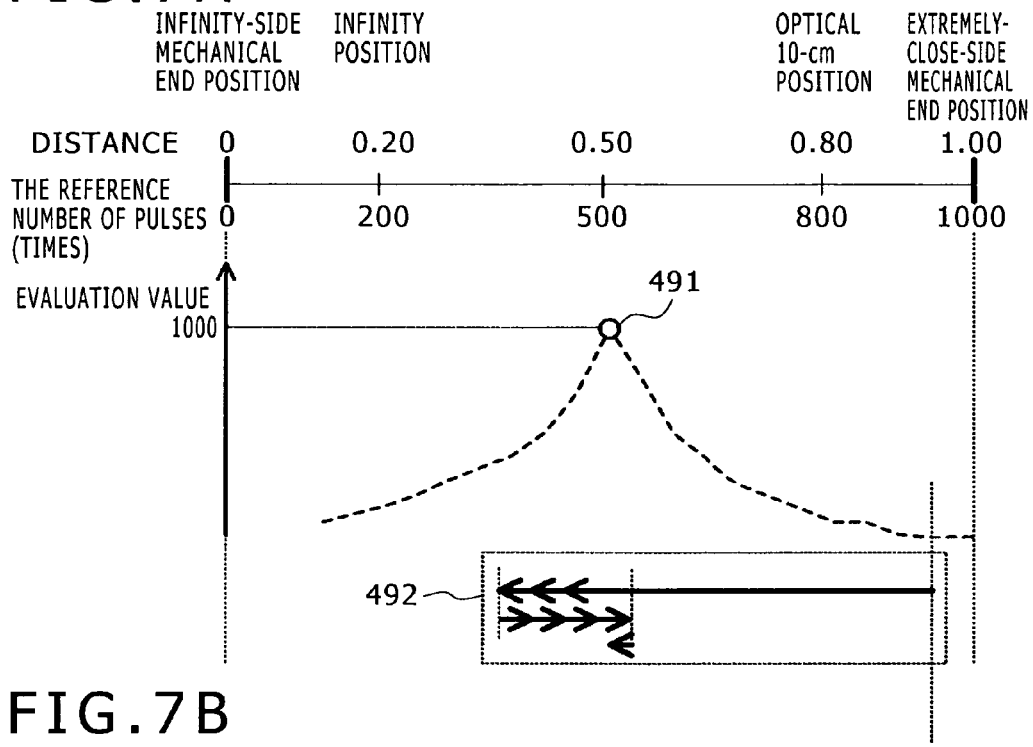
FIGS. 7A and 7B are schematic diagrams showing one example of lens movement after the scan operation in autofocus operation in the imaging device of the first embodiment of the present disclosure, and one example of lens movement after the scan operation in an imaging device of a related art.
Figure 7B:
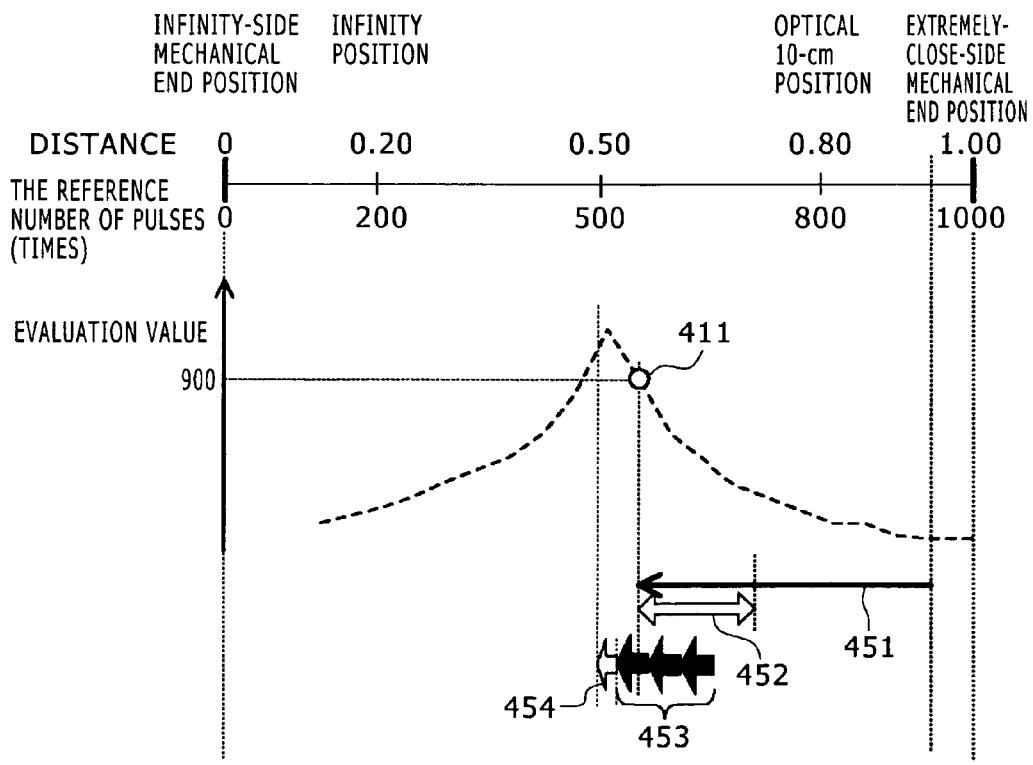

FIGS. 7A and 7B are schematic diagrams showing one example of lens movement after the scan operation in the autofocus operation in the imaging device 100 of the first embodiment of the present disclosure and one example of lens movement after the scan operation in the imaging device of the related art.

In FIG. 7A, one example of lens movement after the scan operation in the autofocus operation in the imaging device of the related art is shown. The example of FIG. 7A is based on the assumption that the imaging device of the related art is an imaging device in which a piezoelectric element is the actuator of the lens and a position sensor of the lens is not provided. Furthermore, in FIG. 7A, the evaluation value (focusing target point 491) of the position that is sought as the position of the highest evaluation value (highest evaluation value position) and serves as the target of lens movement in the imaging device of the related art is shown. In addition, in FIG. 7A, plural arrows (arrow group 492) indicating the operation of the lens in the imaging device of the related art, in which the lens is directly moved from the position immediately after the end of the scan operation to the position of the focusing target point 491, are shown.

As shown by the arrow group 492, in the case of directly moving the lens from the position of the end of the scan operation to the position of the focusing target point 491, the position of the moved lens is divergent from the position of the focusing target point 491 due to increase/decrease in the amount of movement depending on the use environmental condition. For example, if the amount of movement of the lens is larger than the basis, possibly the lens passes through the position of the focusing target point 491. Because there is such a case, the reverse-scan operation is carried out plural times after the direct movement and it is checked whether or not the present lens position results from the passage through the focusing target point 491. If it is checked that the lens position results from the passage, the evaluation value is detected with sequential movement of the lens in the scan direction (direction toward the extremely-close side), to find the focusing target point 491. If the lens position passes through the focusing target point 491 again in this finding, the lens is slightly moved in the reverse-scan direction (direction toward the infinity side) to be moved to the focusing target point 491.

As just described, in the imaging device of the related art, in which the lens is directly moved from the position immediately after the end of the scan operation to the position of the focusing target point 491, the amount of movement of the lens by the piezoelectric element 212 changes depending on the use environment and thus a problem that the movement distance of the lens is long occurs. This extends the time from the start of the autofocus operation to the end. Particularly if a certain amount of waiting time is necessary for the reversal of the movement direction of the lens, the time is further extended.

In FIG. 7B, one example of lens movement after the scan operation in the autofocus operation of the imaging device 100 of the first embodiment of the present disclosure is shown. In FIG. 7B, the target point 411, skip movement 451, an estimated lens position range 452, reverse-scan movement 453, and final adjustment 454 are shown. The skip movement 451 and the estimated lens position range 452 are equivalent to the necessary amount 423 of movement and the estimated lens position range 428, respectively, shown in FIG. 4C. The reverse-scan movement 453 is equivalent to the reverse-scan movement 432 shown in FIG. 5C. The final adjustment 454 is equivalent to the final adjustment 442 to 444 shown in FIG. 6B. Therefore, detailed description of them is omitted and the difference between the imaging device 100 of the first embodiment of the present disclosure and the imaging device of the related art will be described below.

In the imaging device 100, the scan target position (target point 411) that is immediately adjacent, in the scan direction, to the highest evaluation value position is set as the target position. Therefore, the lens does not pass through the highest evaluation value position in the skip operation and the reverse-scan operation. In contrast, in the imaging device of the related art, the highest evaluation value position (focusing target point 491 in FIG. 7A) is set as the target position.

Therefore, there is a possibility that the movement direction of the lens needs to be reversed because of the passage of the lens through the highest evaluation value position.

Furthermore, in the imaging device 100, the movement instruction information is created in consideration of variation in the amount of movement due to posture difference in the skip operation. Therefore, the lens does not pass through the target point 411 also in the skip operation, in which the evaluation value is not detected. In contrast, in the imaging device of the related art, moving the lens to the highest evaluation value position is attempted without considering variation in the amount of movement due to posture difference. Thus, possibly the lens passes through the position of the focusing target point 491.

As just described, in the imaging device 100, the time for the autofocus operation can be shortened although a piezoelectric element is the actuator of the lens and a position sensor of the lens is not provided.

[Operation Example of Imaging Device in Autofocus Operation]

The operation of the imaging device 100 in the autofocus operation of the first embodiment of the present disclosure will be described below with reference to the drawings.

Figure 8:
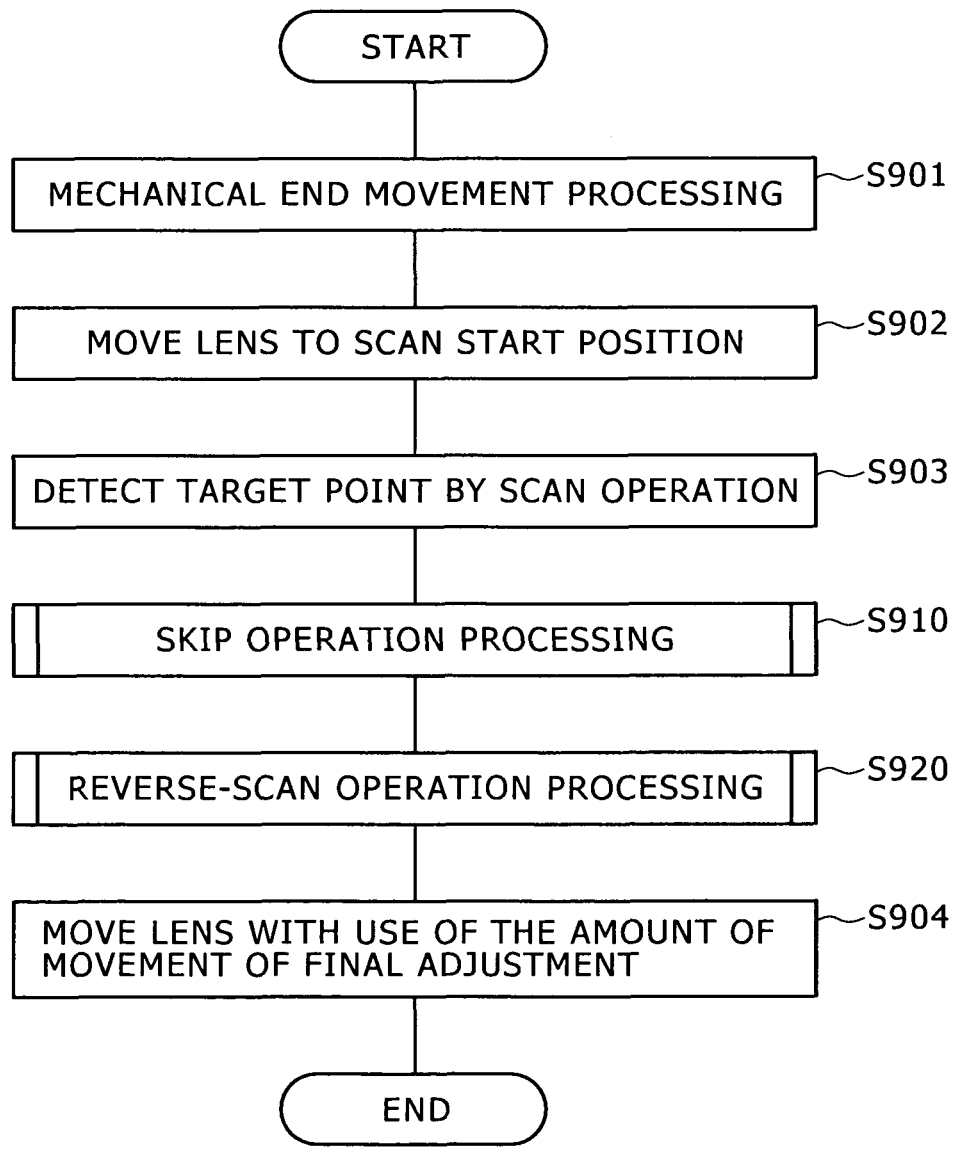
FIG. 8 is a flowchart showing a processing procedure example of the autofocus operation by the imaging device of the first embodiment of the present disclosure.

FIG. 8 is a flowchart showing a processing procedure example of the autofocus operation by the imaging device 100 of the first embodiment of the present disclosure. In FIG. 8, operation from setting of the focusing subject by the user to focusing on the focusing subject is shown.

First, the focus lens 220 (lens) is moved to a mechanical end (step S901). Next, the lens is moved to the scan start position (step S902). Furthermore, the scan target position (target point) that is immediately adjacent, in the scan direction, to the highest evaluation value position is detected by the scan operation (step S903). The step S903 is one example of the detection procedure set forth in the scope of claims.

Subsequently, skip operation processing is executed. Specifically, the lens is moved based on the movement instruction information that defines the distance from the scan end position to the position of the target point as the maximum amount of movement (step S910). The skip operation processing (step S910) will be described later with reference to FIG. 9. Subsequently, reverse-scan operation processing is executed. Specifically, on the basis of the evaluation value of the target point, a series of operations of lens movement and evaluation value detection is repeated in the opposite direction of the scan direction until the detected evaluation value surpasses the evaluation value of the target point (step S920). The reverse-scan operation processing (step S920) will be described later with reference to FIG. 10. The step S920 is one example of the drive control procedure set forth in the slope of claims.

Subsequently, final adjustment is carried out. Specifically, the lens is brought closer to the focusing position by moving the lens one time with a smaller amount of movement than the amount of movement of one step in the scan operation (step S904). Thereupon, the autofocus operation processing procedure is ended.

Figure 9:
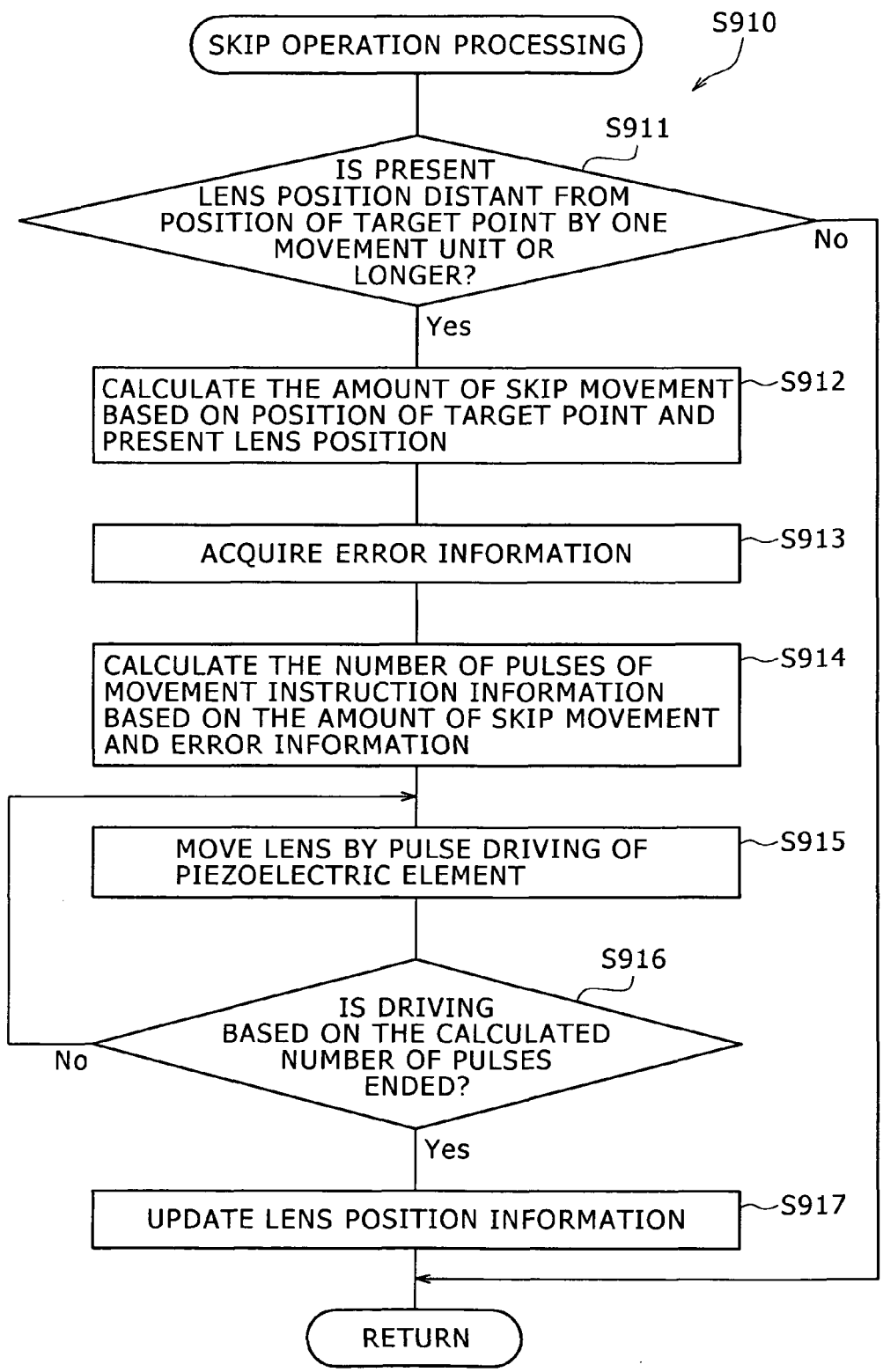
FIG. 9 is a flowchart showing a processing procedure example of skip operation processing in the autofocus operation of the first embodiment of the present disclosure.

FIG. 9 is a flowchart showing a processing procedure example of the skip operation processing (step S910) in the autofocus operation of the first embodiment of the present disclosure.

First, it is determined whether or not the present lens position immediately after the end of the scan operation is distant from the position of the target point by one movement unit (one step of the reverse-scan operation) or longer (step S911).

If it is determined that the lens position is not distant by one movement unit or longer (step S911), the skip operation processing is ended.

In contrast, if it is determined that the lens position is distant by one movement unit or longer (step S911), the amount of skip movement serving as the basis of calculation of the amount of movement (the number of pulses) in the skip operation is calculated based on the distance between the position of the target point and the present lens position (step S912). Next, the error information is acquired (step S913). Thereafter, the number of pulses of the movement instruction information relating to the skip operation is calculated based on the amount of skip movement and the error information (step S914). The calculation in this step S914 is performed by using e.g. the above-described Equation 1.

Next, the piezoelectric element driver 211 performs pulse driving of the piezoelectric element 212 based on the supplied movement instruction information to thereby move the lens in the direction toward the infinity side (step S915). Subsequently, it is determined whether or not the lens driving based on the movement instruction information has been ended through counting of the number of pulses supplied to the piezoelectric element 212 by the piezoelectric element driver 211 (step S916). If it is determined that the lens movement based on the calculated number of pulses of the movement instruction information has not been ended (step S916), the processing returns to the step S915 and thus the waiting state is kept until the driving is ended.

In contrast, if it is determined that the lens driving based on the calculated number of pulses of the movement instruction information has been ended (step S916), the lens position information indicating the lens position by the reference number of pulses is updated (step S917).

Figure 10:
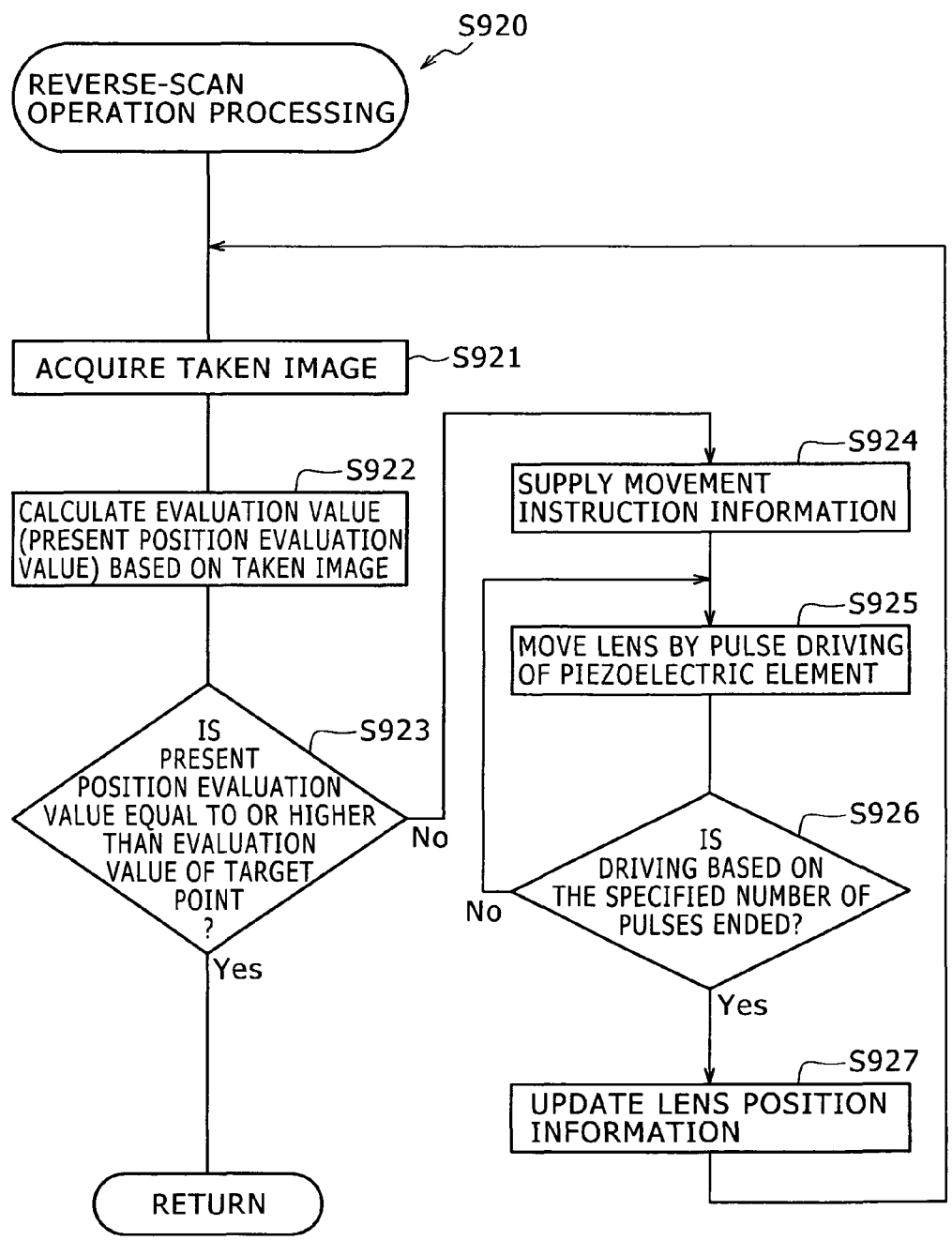
FIG. 10 is a flowchart showing a processing procedure example of reverse-scan operation processing in the autofocus operation of the first embodiment of the present disclosure.

FIG. 10 is a flowchart showing a processing procedure example of the reverse-scan operation processing (step S920) in the autofocus operation of the first embodiment of the present disclosure.

First, a taken image is acquired by the imaging element 120 (step S921). Thereafter, the evaluation value of the lens position at which the taken image is acquired (present position evaluation value) is calculated by the evaluation value generator 160 by using the data of the acquired taken image (step S922).

Subsequently, the detector 310 determines whether or not the calculated present position evaluation value is a value indicating a degree of focusing equal to or higher than the evaluation value of the target point (step S923). If it is determined that the present position evaluation value is a value indicating a degree of focusing equal to or higher than the evaluation value of the target point (step S923), the reverse-scan operation processing is ended.

In contrast, if it is determined that the present position evaluation value is not a value indicating a degree of focusing equal to or higher than the evaluation value of the target point (step S923), the movement instruction information including the predetermined number of pulses supplied in the reverse-scan operation is supplied from the drive controller 320 to the drive part 210 (step S924). Subsequently, the piezoelectric element driver 211 performs pulse driving of the piezoelectric element 212 based on the supplied movement instruction information to thereby move the lens in the direction toward the infinity side (step S925). Furthermore, it is determined whether or not the lens driving based on the movement instruction information has been ended through counting of the number of pulses supplied to the piezoelectric element 212 by the piezoelectric element driver 211 (step S926). If the number of pulses supplied to the piezoelectric element 212 is smaller than the number of pulses specified by the movement instruction information and it is determined that the lens driving based on the movement instruction information has not been ended (step S926), the processing returns to the step S925 and thus the waiting state is kept until the driving is ended.

In contrast, if the number of pulses supplied to the piezoelectric element 212 has become the number of pulses specified by the movement instruction information and it is determined that the lens driving based on the movement instruction information has been ended (step S926), the lens position information is updated (step S927) and thereafter the processing returns to the step S921.

In this manner, in the first embodiment of the present disclosure, the lens is moved by the skip operation, the reverse-scan operation, and the final adjustment operation, and thus the lens can be moved to the scan target position (target point) through only lens movement in the opposite direction of the direction of the scan operation. This can shorten the time for the focus control and enhance the focusing accuracy, and enables efficient focus control.

2. Second Embodiment

In the above-described example relating to the first embodiment of the present disclosure, control is so carried out that the lens does not pass through the scan target position (target point) even in the worst case in the skip operation. Due to this control, under any use environment, the lens is not moved to a position closer to the infinity side than the scan target position in the skip operation. However, the amount of skip movement is small in the environment under which the imaging device 100 is generally used (environment in which the horizontal plane is parallel to the movement direction (optical axis direction) of the focus lens 220).

So, a second embodiment of the present disclosure employs an example of a technique in which the skip operation is set with optimization to the environment that is generally used and lens movement to the focusing position in the case in which the lens has passed through the scan target position is performed by a method different from the reverse-scan operation and the final adjustment operation. The example will be described below with reference to FIG. 11A to FIG. 16.

[Skip Operation Example]

Figure 11A:
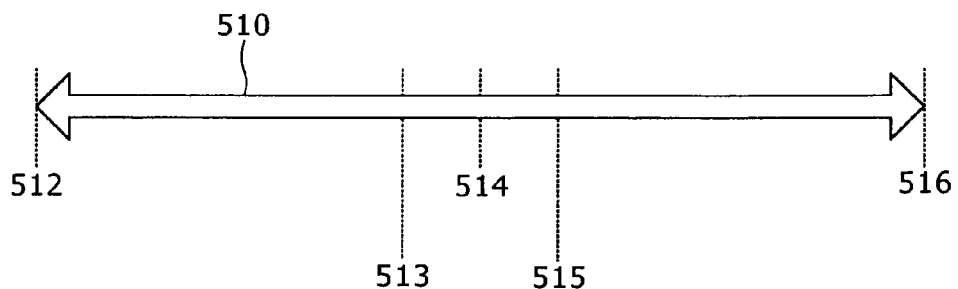
FIGS. 11A and 11B are schematic diagrams showing one example of the skip operation by the detector and the drive controller in a second embodiment of the present disclosure.
Figure 11B:
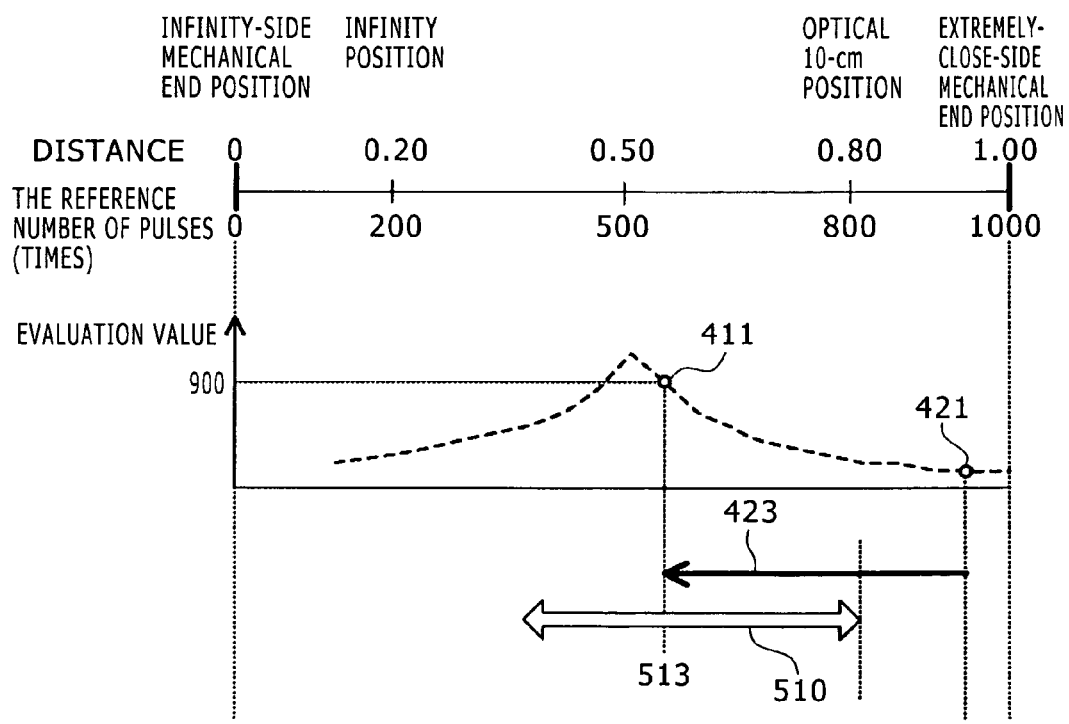

FIGS. 11A and 11B are schematic diagrams showing one example of the skip operation by the detector 310 and the drive controller 320 in the second embodiment of the present disclosure. In the second embodiment of the present disclosure, the error information retainer 131 retains a posture threshold coefficient in addition to the error information.

FIG. 11A schematically shows the relationship between the posture of the imaging device 100 and the range of the position at which the focus lens 220 is estimated to exist after movement based on the movement instruction information relating to the skip operation (estimated lens position range 510). In FIG. 11A, the lens position (right upward direction (+90°) 512) in the case in which the imaging device 100 is oriented in the right upward direction (worst case) and the lens position (right downward direction (−90°) 516) in the case in which the imaging device 100 is oriented in the right downward direction are shown. Furthermore, the lens position (horizontal direction (0°) 514) in the case in which the imaging device 100 is oriented in the horizontal direction (horizontal plane is parallel to the movement direction (optical axis direction) of the focus lens 220) is shown. In addition, the lens position (obliquely-upward direction (+15°) 513) in the case in which the imaging device 100 is oriented in the obliquely upward direction at an angle of 15° to the horizontal direction and the lens position (obliquely-downward direction (−15°) 515) in the case in which the imaging device 100 is oriented in the obliquely downward direction at an angle of 15° to the horizontal direction are shown.

As shown in FIG. 11A, the lens position in the case of the horizontal direction (horizontal direction (0°) 514), which is the environment generally used, is the center in the range when the worst case is taken into consideration (range from the right upward direction (+90°) 512 to the right downward direction (−90°) 516). That is, if the skip operation is set in consideration of the worst case, the lens position resulting from the skip operation is distant from the scan target position by a considerably long distance (distance from the right upward direction (+90°) 512 to the horizontal direction) (0°) 514) in the case of the horizontal direction, which is the environment generally used. Thus, when the imaging device 100 is used under the general environment, the number of times of the reverse-scan operation is large and the time for the autofocus operation is long.

So, in the imaging device 100 of the second embodiment of the present disclosure, the skip operation suitable for the case in which the imaging device 100 is used under the general environment is set. For example, the skip operation is so set that the lens position does not pass through the scan target position in the case of a direction in the range from the obliquely-upward direction (+15°) 513 to the right downward direction (−90°) 516.

FIG. 11B schematically shows the case in which the skip operation is so set that the lens position does not pass through the scan target position in the case of a direction in the range from the obliquely-upward direction (+15°) 513 to the right downward direction (−90°) 516. The factors other than the estimated lens position range 510 and the obliquely-upward direction (+15°) 513 shown in FIG. 11B are the same as those shown in FIGS. 4A to 4C and therefore description thereof is omitted.

As shown in FIG. 11B, in the second embodiment of the present disclosure, the estimated lens position range 510 is such a range as to include also positions closer to the infinity side than the target point 411. Furthermore, the estimated lens position range 510 is such a range that the position of the obliquely-upward direction (+15°) 513 corresponds to the position of the target point 411.

The method for calculating the number of pulses of the movement instruction information relating to the skip operation of the second embodiment of the present disclosure will be described below.

The drive controller 320 sets the number of pulses of the movement instruction information in such a manner that the lens position becomes the position of the target point 411 in the case of the obliquely-upward direction (+15°) 513.

The number (P) of pulses of the movement instruction information relating to this skip operation is calculated by using e.g. the following Equation 2.

$$P = A \times T \qquad \text{Equation 2}$$

The amount A of movement is the same as that in Equation 1 and therefore its description is omitted. T is a coefficient (posture threshold coefficient) for calculating such a number of pulses that the lens position becomes the position of the target point 411 in the case of a certain posture. In the case shown in FIG. 11B, this posture threshold coefficient T is the coefficient for calculating such a number of pulses that the lens position becomes the position of the target point 411 when the imaging device 100 is oriented in the obliquely-upward direction at an angle of 15° to the horizontal direction (obliquely-upward direction (+15°) 513). The posture threshold coefficient T is decided in advance in individual adjustment at the manufacturing stage and is retained in the error information retainer 131 as the posture threshold coefficient. For example, if the number P of pulses of the movement instruction information relating to the skip operation is calculated by multiplying the number of pulses indicated by the amount A of movement by "0.9," this value "0.9" is decided as the posture threshold coefficient T to be retained in the error information retainer 131.

As shown by Equation 2, variation in the amount of movement due to temperature difference is not considered in calculation of the number P of pulses with use of the posture threshold coefficient T. This is for the same reason as the reason why temperature difference is not considered in calculation based on Equation 1. Specifically, the scan operation and the skip operation are control carried out in a very short time and temperature change in the processing time is substantially ignorable. Therefore, there is no need to consider the temperature characteristics in the calculation of the number of pulses as the amount of skip movement.

In this manner, in the imaging device 100 of the second embodiment of the present disclosure, the number P of pulses of the movement instruction information is calculated by using the posture threshold coefficient T. In the case of this number P of pulses, the lens is moved to a position closer to the infinity side than the scan target position (target point 411) when the imaging device 100 is oriented in a direction in the range from the obliquely-upward direction (+15°) to the right upward direction (+90°). So, in the second embodiment of the present disclosure, the lens is moved based on the distance (the amount of movement) between the mechanical end and the highest evaluation value position if the series of operation of checking the evaluation value with sequential lens movement is not ended within a predetermined number of times in the reverse-scan operation.

[Reverse-Scan Operation Example]

Figure 12A:
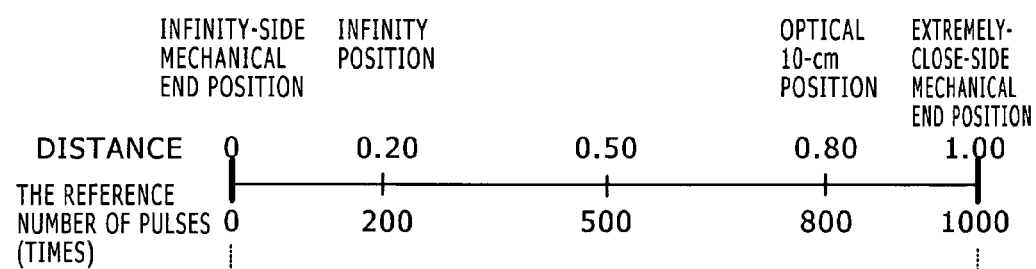
FIGS. 12A to 12C are schematic diagrams showing one example of the autofocus operation when a scan target position is not detected within a predetermined number of times of the reverse-scan operation by the detector and the drive controller in the second embodiment of the present disclosure.
Figure 12B:
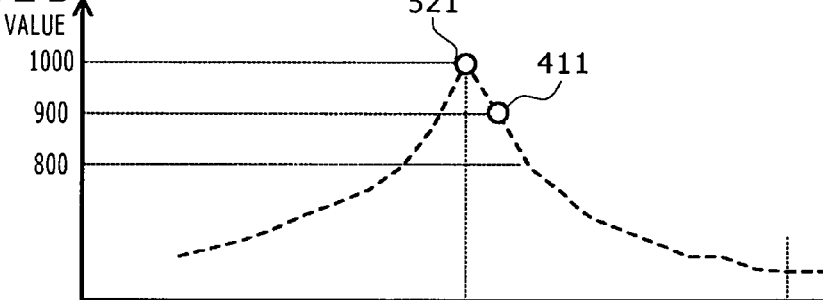
Figure 12C:
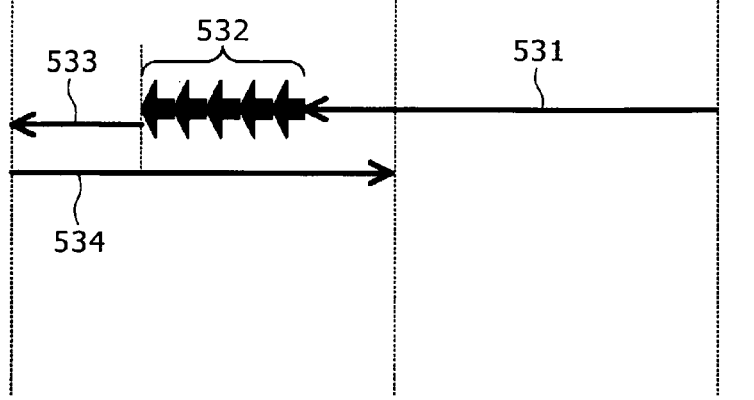

FIGS. 12A to 12C are schematic diagrams showing one example of the autofocus operation when the scan target position is not detected within a predetermined number of times of the reverse-scan operation by the detector 310 and the drive controller 320 in the second embodiment of the present disclosure.

In FIG. 12A, the distance of the leg between the infinity-side mechanical end and the extremely-close-side mechanical end as the movement leg of the focus lens 220 is schematically shown in the abscissa direction, similarly to FIG. 3A.

In FIG. 12B, the target point 411 shown in FIG. 3B is shown in such a manner that the ordinate is used as the axis showing the evaluation value and the abscissa is used as the axis showing the movable leg of the focus lens 220 similarly to FIG. 12A. Furthermore, in FIG. 12B, the white circle indicating the highest evaluation value position (focusing point 521) is shown.

FIG. 12C schematically shows one example of the autofocus operation when the lens passes through the scan target position by the skip operation. In FIG. 12C, skip movement 531, reverse-scan movement 532, mechanical end movement 533, and focusing position movement 534 are shown.

As shown by the skip movement 531, possibly the lens is moved to a position closer to the infinity side than the target point 411 by the skip operation in the second embodiment of the present disclosure. So, in the second embodiment of the present disclosure, the upper-limit number of times of the series of operation of checking the evaluation value with sequential lens movement in the reverse-scan operation is set. If an evaluation value equal to or higher than the evaluation value of the target point 411 cannot be detected within this number of times, once the lens is brought into contact with the mechanical end with which the lens is brought into contact at the start of the autofocus operation, and the lens is moved based on the amount of movement (the number of pulses) between the mechanical end position and the highest evaluation value position. That is, based on the amount of movement (the number of pulses) between the mechanical end position and the highest evaluation value position, the lens is moved in the same direction as that of the scan operation, by which this amount of movement is measured. In FIG. 12C, the movement when once the lens is brought into contact with the mechanical end with which the lens is brought into contact at the start of the autofocus operation is shown as the mechanical end movement 533. Furthermore, the lens movement based on the amount of movement (the number of pulses) between the position of the mechanical end with which the lens is brought into contact and the highest evaluation value position (focusing point 521) is shown as the focusing position movement 534.

In this manner, in the second embodiment of the present disclosure, the upper-limit number of times of the reverse-scan operation is set and the lens is moved from the mechanical end to the highest evaluation value position if an evaluation value higher than the target point 411 cannot be detected within this number of times. This allows the lens to be moved to the highest evaluation value position even if the use environment of the imaging device 100 is not the general environment and the lens position passes through the scan target position in the skip operation. This focusing from the mechanical end takes a long time because the amount of movement is larger than the amount of movement shown in the first embodiment of the present disclosure. So, by allowing the user to set whether the error information or the posture threshold coefficient is used to carry out the skip operation in matching with the use mode of the imaging device 100, the focusing from the mechanical end can be reduced and the time for the autofocus operation can be shortened.

This movement way, in which the upper-limit number of times of the reverse-scan operation is set and the lens is moved to the mechanical end and then to the focusing position if an evaluation value higher than the target point 411 cannot be detected within this number of times, has advantages besides the advantage for the case in which the lens position passes through the scan target position. For example, if the amount of movement by the skip operation is too small and thus the number of times of the series of operation in the reverse-scan operation until the lens reaches the target point 411 will be very large, possibly employing this movement way can shorten the time for the focus control. Furthermore, possibly the lens can be properly moved to the focusing position in the case in which the subject moves in detection of the evaluation value near the target point 411 in the reverse-scan operation and thus the evaluation value instantaneously changes. In addition, possibly the lens can be properly moved to the focusing position also in the case in which another object instantaneously cuts across in detection of the evaluation value near the target point 411 in the reverse-scan operation and thus the evaluation value instantaneously changes.

[Operation Example of Imaging Device in Autofocus Operation]

The operation of the imaging device 100 in the autofocus operation of the second embodiment of the present disclosure will be described below with reference to the drawings.

Figure 13:
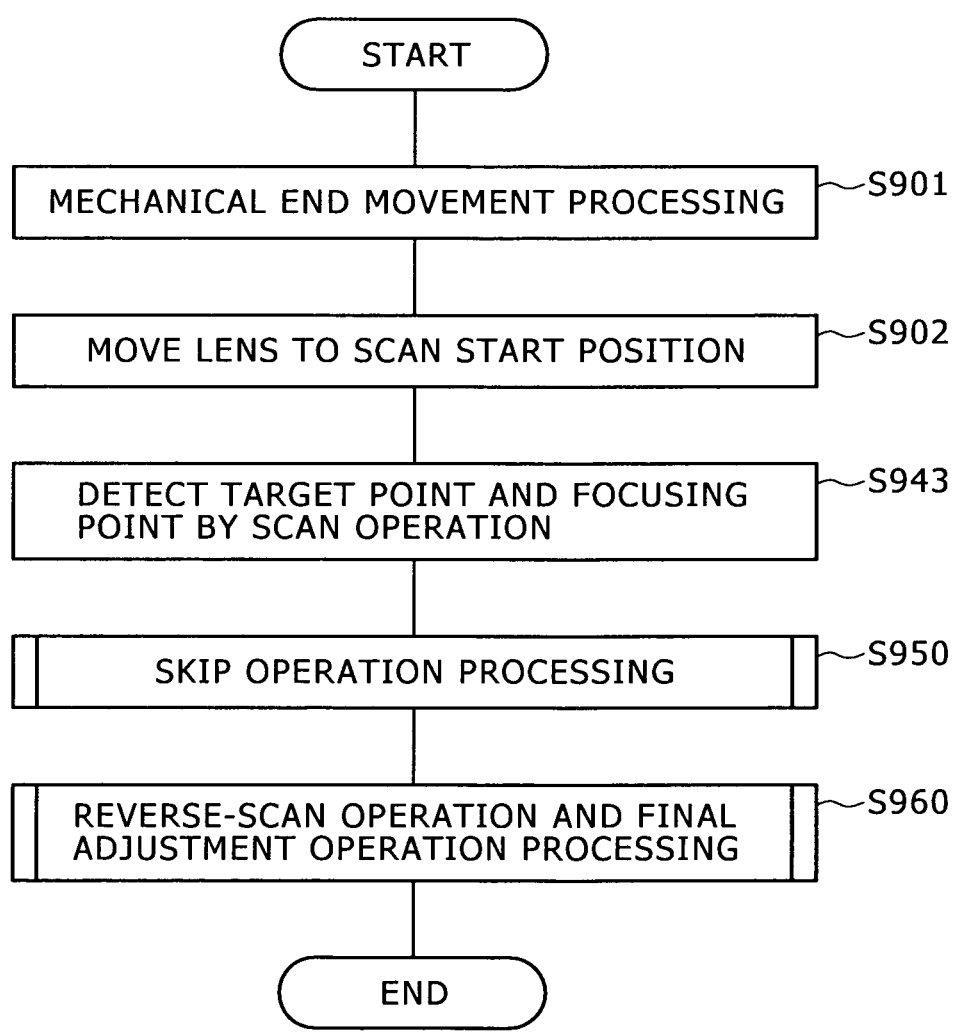
FIG. 13 is a flowchart showing a processing procedure example of the autofocus operation by the imaging device of the second embodiment of the present disclosure.

FIG. 13 is a flowchart showing a processing procedure example of the autofocus operation by the imaging device 100 of the second embodiment of the present disclosure. This processing procedure is a modification example of FIG. 8 and is different in that it is determined whether or not to calculate the amount of movement by using the posture threshold coefficient in the skip operation and a threshold is set in the reverse-scan operation. So, the parts common to FIG. 8 are given the same numerals and part of description of them is omitted.

After the lens is moved to the scan start position (step S902), the highest evaluation value position (focusing point) and the scan target position (target point) are detected by the scan operation (step S943). Subsequently, the skip operation processing is executed by using the posture threshold coefficient or the error information (step S950). The skip operation processing (step S950) will be described later with reference to FIG. 14.

Furthermore, the reverse-scan operation and final adjustment operation processing for moving the lens from the position after the skip operation to the highest evaluation value position is executed (step S960), so that the autofocus operation processing procedure is ended. The reverse-scan operation and final adjustment operation processing (step S960) will be described later with reference to FIG. 15.

Figure 14:
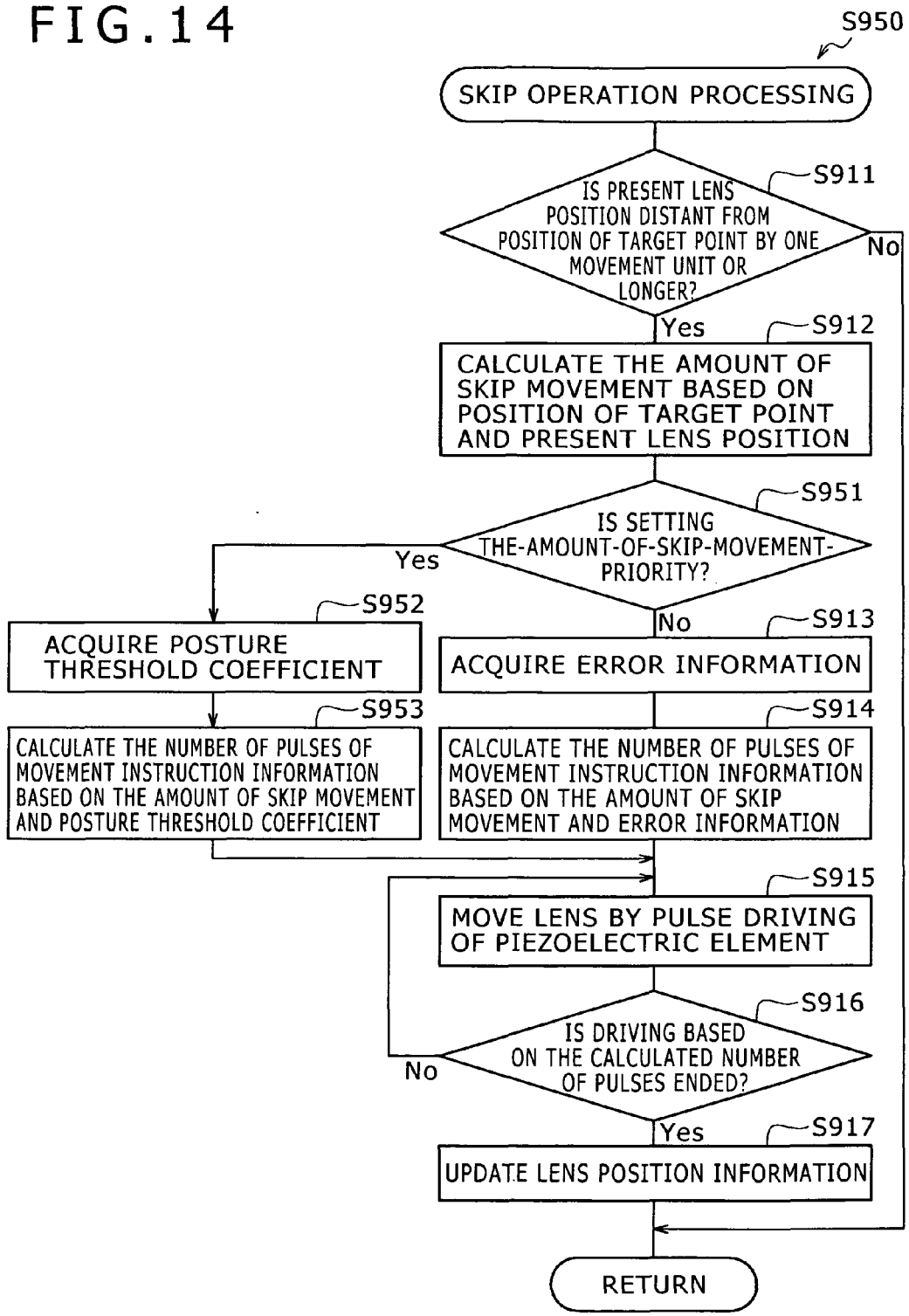
FIG. 14 is a flowchart showing a processing procedure example of skip operation processing in the autofocus operation of the second embodiment of the present disclosure.

FIG. 14 is a flowchart showing a processing procedure example of the skip operation processing (step S950) in the autofocus operation of the second embodiment of the present disclosure. This processing procedure is a modification example of FIG. 9 and is different in that it is determined whether or not to calculate the amount of movement by using the posture threshold coefficient. So, the parts common to FIG. 9 are given the same numerals and part of description of them is omitted.

After the amount of skip movement serving as the basis of calculation of the amount of movement (the number of pulses) in the skip operation is calculated based on the distance between the position of the target point and the present lens position (step S912), it is determined whether or not the mode in which the skip operation is carried out by using the posture threshold coefficient (the-amount-of-skip-movement-priority) is set (step S951). If it is determined that the-amount-of-skip-movement-priority is not set (step S951), the processing proceeds to the step S913.

In contrast, if it is determined that the-amount-of-skip-movement-priority is set (step S951), the posture threshold coefficient is acquired from the error information retainer 131 (step S952). Thereafter, the number of pulses of the movement instruction information relating to the skip operation is calculated based on the amount of skip movement and the posture threshold coefficient (step S953). The calculation in this step S953 is performed by using e.g. the above-described Equation 2.

Figure 15:
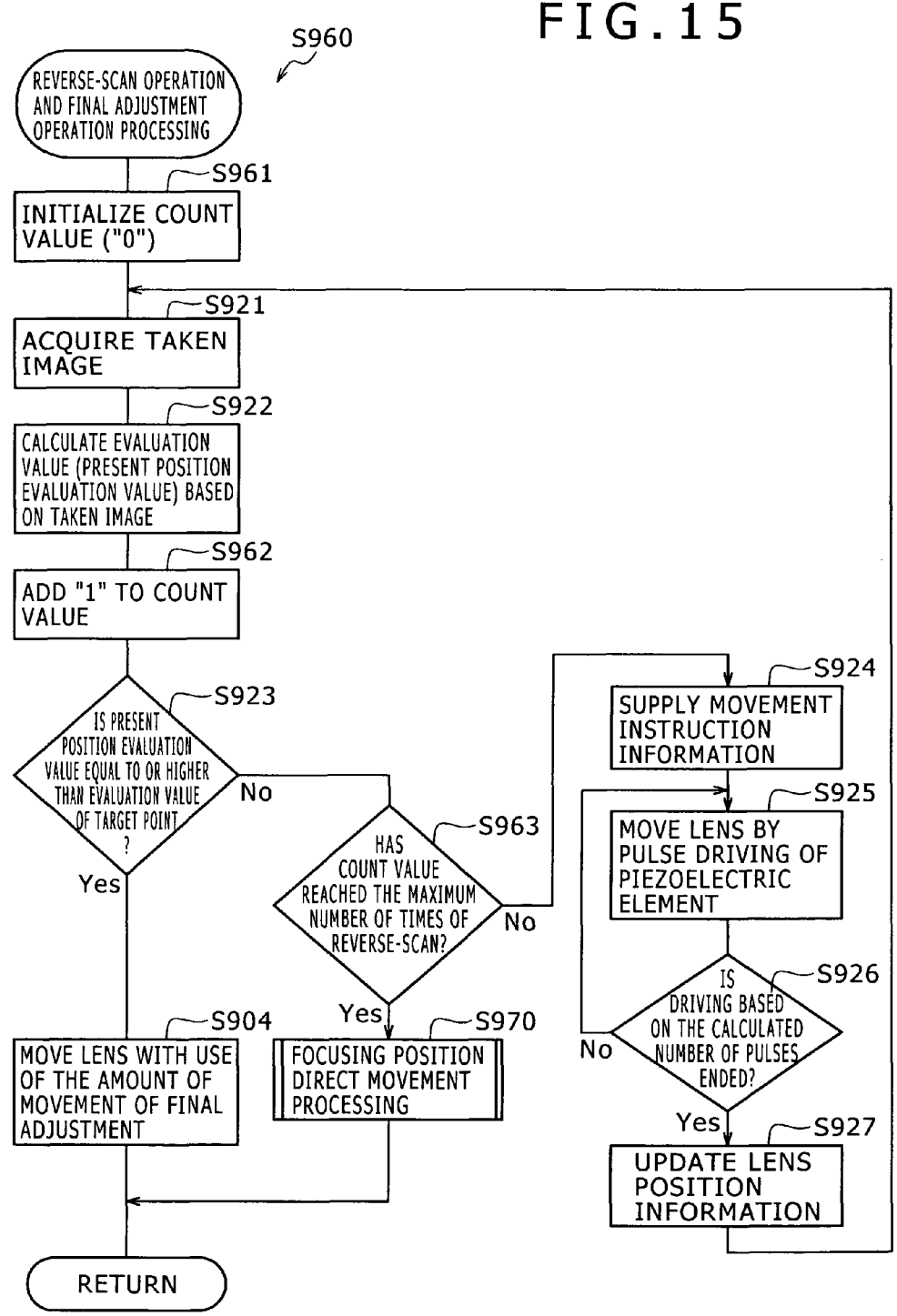
FIG. 15 is a flowchart showing a processing procedure example of reverse-scan operation and final adjustment operation processing in the autofocus operation of the second embodiment of the present disclosure.

FIG. 15 is a flowchart showing a processing procedure example of the reverse-scan operation and final adjustment operation processing (step S960) in the autofocus operation of the second embodiment of the present disclosure. This processing procedure is a modification example of FIG. 10 and is different in that the threshold is set in the reverse-scan operation. So, the parts common to FIG. 10 are given the same numerals and part of description of them is omitted. Furthermore, the step S904 shown in FIG. 8 is represented in FIG. 15 instead of being represented in FIG. 13.

First, the count value for counting the number of times of the series of operation of checking the evaluation value with sequential lens movement in the reverse-scan operation is initialized to "0" (step S961), and the processing proceeds to the step S921.

After the evaluation value of the lens position at which a taken image is acquired (present position evaluation value) is calculated by the evaluation value generator 160 (step S922), the count value is updated by adding "1" to the count value (step S962).

Furthermore, after it is determined that the present position evaluation value is not a value indicating a degree of focusing equal to or higher than the evaluation value of the target point (step S923), it is determined whether or not the count value has reached the threshold (the maximum number of times of reverse scan) (step S963). If it is determined that the count value has not reached the maximum number of times of reverse scan (step S963), the processing proceeds to the step S924.

In contrast, if it is determined that the count value has reached the maximum number of times of reverse scan (step S963), focusing position direct movement processing is executed. Specifically, the lens is brought into contact with the mechanical end and then directly moved to the position of the focusing point (step S970). The focusing position direct movement processing (step S970) will be described below with reference to FIG. 16.

FIG. 16 is a flowchart showing a processing procedure example of the focusing position direct movement processing (step S970) in the autofocus operation of the second embodiment of the present disclosure.

First, similarly to the step S901, the focus lens 220 (lens) is moved to the mechanical end (step S971). Furthermore, the number of pulses of the movement instruction information relating to the movement from the mechanical end to the target point is calculated based on the mechanical end position and the position of the focusing point (step S974). This number of pulses of the movement instruction information is the same as the number of pulses used for the movement from the mechanical end position to the focusing point in the scan operation.

Next, the piezoelectric element driver 211 performs pulse driving of the piezoelectric element 212 based on the supplied movement instruction information to thereby move the lens in the direction toward the extremely-close side (movement direction of the lens in the scan operation) (step S975). Subsequently, it is determined whether or not the lens driving based on the movement instruction information has been ended through counting of the number of pulses supplied to the piezoelectric element 212 by the piezoelectric element driver 211 (step S976). If it is determined that the lens movement based on the calculated number of pulses of the movement instruction information has not been ended (step S976), the processing returns to the step S975 and the waiting state is kept until the driving is ended.

In contrast, if it is determined that the lens driving based on the calculated number of pulses of the movement instruction information has been ended (step S976), the focusing position direct movement processing is ended.

In this manner, in the second embodiment of the present disclosure, the amount of movement is calculated by using the posture threshold coefficient in the skip operation with optimization to the environment under which the imaging device is generally used. This can enhance the effect of the skip operation in the environment generally used. Furthermore, a threshold is set for the series of operation of detecting the evaluation value with sequential lens movement in the reverse-scan operation. This allows the lens to be moved to the focusing position even when the lens passes through the scan target position. Due to this feature, the focus control can be efficiently carried out.

In the above-described manner, according to the embodiments of the present disclosure, the time for the focus control can be shortened in an imaging device in which a piezoelectric element is the actuator of the lens and a position sensor of the lens is not provided. Due to this feature, the focus adjustment time in the autofocus operation is shortened compared with the related art, in which a movement error due to the influence of the posture and the temperature is not considered. Furthermore, according to the embodiments of the present disclosure, the lens is moved with detection of the evaluation value in the reverse-scan operation. Thus, the focusing accuracy can be enhanced compared with the case in which the number of pulses is calculated from the lens position and the lens is directly moved to the focusing position. According to the embodiments of the present disclosure, there is no need to provide a position sensor, a temperature detecting sensor, and an acceleration sensor to detect posture difference. Thus, the size of the lens module can be reduced and the lens module can be manufactured at low cost.

In the above-described example relating to the embodiments of the present disclosure, the scan operation is carried out from the infinity side toward the extremely-close side and the reverse-scan operation is carried out in the direction toward the infinity side. However, the operation way is not limited thereto. The technique can be similarly implemented also in the case in which the scan operation is carried out from the extremely-close side toward the infinity side and the reverse-scan operation is carried out in the direction toward the extremely-close side (all the lens movement directions are opposite).

Furthermore, in the above-described example relating to the embodiments of the present disclosure, each of the in-ascent posture difference variation ratio and the in-descent posture difference variation ratio is one value. However, it will also be possible that each of them has different values depending on the lens movement direction (direction toward the infinity side and direction toward the extremely-close side). In this case, the technique can be implemented similarly to the embodiments of the present disclosure by using a proper value in matching with the movement direction in calculation of the number of pulses of the movement instruction information relating to the skip operation.

For the embodiments of the present disclosure, an example of a camera module incorporated into a portable information terminal is described. However, application is not limited thereto. The technique can be applied also to video camcorders, digital cameras, and so forth. For example, in a single-lens reflex camera, error information is retained in an exchangeable lens and the camera main body is allowed to acquire the error information. Thus, the technique can be implemented similarly to the embodiments of the present disclosure.

In the above-described example relating to the embodiments of the present disclosure, a piezoelectric element is envisaged as the focus adjusting element (actuator) and the lens is moved between two mechanical ends. However, the configuration is not limited thereto. If the lens is moved by an actuator having the characteristic of hysteresis between supplied power and the amount of driving (the amount of movement and the amount of change) of the lens, an error occurs in the amount of movement and therefore the technique can be implemented similarly to the embodiments of the present disclosure. For example, the technique can be similarly implemented also in the case in which a shape-memory alloy that moves the lens position by movement (including also expansion and contraction) of the drive shaft similarly to the piezoelectric element is used as the actuator.

For the embodiments of the present disclosure, an imaging device that moves the lens in the optical axis direction to thereby adjust the focus is described. However, the configuration is not limited thereto. For example, if the actuator has the hysteresis characteristic, the technique can be similarly implemented also when the lens is deformed (part or the entire lens is deformed) to thereby change the optical characteristics of the lens and adjust the focus. In this case, a liquid lens, an electrically-conductive polymer actuator, a polymer resin material, and so forth are used as the actuator. Also when the lens is deformed by any of these actuators, an error occurs between supplied power and the amount of deformation of the lens. In this case, the leg between the mechanical ends (see e.g. FIG. 3A to FIG. 7B) described for the embodiments of the present disclosure is set as the deformable shape range of the lens. Furthermore, the amount of power supplied to deform the lens in the autofocus operation is used to calculate variation in the lens position (shape) similarly to the number of pulses supplied to the piezoelectric element 212 in the embodiments of the present disclosure. Due to these features, the technique can be implemented similarly to the embodiments of the present disclosure also when the autofocus operation is carried out through lens deformation. Furthermore, although the influence of only the posture and the temperature is considered in the above-described example, the configuration is not limited thereto. Also when the amount of movement changes due to another factor, the technique can be similarly implemented by retaining the error information relating to this factor.

The embodiments of the present disclosure are one example for embodying the present disclosure. As clearly specified for the embodiments of the present disclosure, items in the embodiments of the present disclosure and disclosure-specifying items in the scope of claims have correspondence relationships. Similarly, disclosure-specifying items in the scope of claims and items given the same names as those of the disclosure-specifying items in the embodiments of the present disclosure have correspondence relationships. However, the present disclosure is not limited to the embodiments and can be embodied by making various changes for the embodiments without departing from the gist of the present disclosure.

The processing procedures described for the embodiments of the present disclosure may be considered as methods having these series of procedures and may be considered as a program for causing a computer to carry out these series of procedures or a recording medium to store the program. As this recoding medium, e.g. compact disc (CD), MiniDisc (MD), digital versatile disk (DVD), a memory card, and a Blu-ray disc (registered trademark) can be used.

The present application contains subject matter related to that disclosed in Japanese Priority Patent Application JP 2010-246008 filed in the Japan Patent Office on Nov. 2, 2010, the entire content of which is hereby incorporated by reference.

What is claimed is:

1. An imaging device comprising:
    a detector configured to repeatedly carry out a series of operations of generating evaluation values to evaluate a degree of focusing for each position of a lens after driving the lens based on a drive instruction by a focus adjusting element that changes or adjusts a focal length depending on supplied power toward one end part in a drive range of the lens, the detector detecting the evaluation value of a position that is closer to the end part than a position of an evaluation value of a highest degree of focusing and is immediately adjacent or adjacent across a predetermined number of positions to the position of the evaluation value of the highest degree of focusing; and a drive controller configured to cause the series of operations be repeatedly carried out toward the other end part in the drive range of the lens, and drive the lens to a position of a degree of focusing not smaller than the detected evaluation value based on the detected evaluation value, wherein the drive instruction relating to the series of operations repeatedly carried out toward the one end part is a drive instruction for driving the focus adjusting element a predetermined number of times, and the drive controller drives the lens one time toward the other end part based on the drive instruction for driving the focus adjusting element a smaller number of times than the predetermined number of times, after repeatedly carrying out the series of operations toward the other end part.

2. The imaging device according to claim 1, wherein the drive controller calculates a distance between a position at which repetition of the series of operations of generating the evaluation value is ended and the position of the detected evaluation value and drives the lens by the calculated distance based on error information relating to an error from an amount of driving of the lens by the focus adjusting element and the calculated distance, before repeatedly carrying out the series of operations in a direction opposite to a direction of the driving.

3. The imaging device according to claim 2, wherein the error information is first information relating to an error in a case in which the amount of driving of the lens by one time of driving by the focus adjusting element is maximum due to posture difference of the imaging device, and second information relating to an error in a case in which the amount of driving of the lens by one time of driving by the focus adjusting element is minimum due to the posture difference, and the drive controller calculates the number of times the lens has to be driven by the focus adjusting element in a case in which the amount of driving relating to driving of the lens toward the one end part is maximum and the amount of driving relating to driving of the lens toward the other end part is minimum, based on the calculated distance, the first information, and the second information, and drives the lens the calculated number of times.

4. The imaging device according to claim 3, wherein the drive controller repeatedly carries out the series of operations from a position after driving of the lens based on the calculated number of times toward the other end part, and drives the lens to a position of a degree of focusing not smaller than the detected evaluation value.

5. The imaging device according to claim 1, wherein the drive controller calculates a distance between a position at which repetition of the series of operations of generating the evaluation value is ended and a position of the detected evaluation value and drives the lens by the calculated distance based on a threshold coefficient for considering posture difference in a predetermined environment and the calculated distance, before repeatedly carrying out the series of operations toward the other end part.

6. The imaging device according to claim 1, wherein the drive controller drives the lens to the position of the evaluation value of the highest degree of focusing based on a distance between the position of the evaluation value of the highest degree of focusing and one end part of two end parts in the drive range of the lens after driving the lens to the one end part, if the drive controller fails to drive the lens to a position of a degree of focusing not smaller than the detected evaluation value by a predetermined number of times of repetition of the series of operations toward the other end part.

7. The imaging device according to claim 1, wherein the lens is a focus lens.

8. The imaging device according to claim 1, wherein the focus adjusting element is in contact with the lens with an intermediary drive shaft, and the focus adjusting element drives the lens by using increase and decrease in friction force between the drive shaft and the lens due to repetition of expansion and contraction of the focus adjusting element in a specific direction with displacement speed change.

9. The imaging device according to claim 1, wherein the focus adjusting element changes or adjusts the focal length through movement or deformation of the lens.

10. The imaging device according to claim 1, wherein the focus adjusting element is one of a piezoelectric element or a shape-memory alloy.

11. The imaging device according to claim 1, wherein the focus adjusting element is a liquid lens, an electrically-conductive polymer actuator, or a polymer resin material that is deformed depending on supplied power, and changes or adjusts the focal length through deformation of the lens.

12. The imaging device according to claim 1, wherein the drive controller supplies the drive instruction based on the amount of driving and drive direction with which the lens is driven.

13. The imaging device according to claim 1, wherein the drive controller considers posture of the imaging device in a specific direction that corresponds with a horizontal plane, and estimates information indicating the number of times of driving by the focus adjusting element equivalent to distance from one end part of two end parts in the drive range of the lens as a position at which the lens exists based on the amount of driving of the lens by one time of drive operation by the focus adjusting element in a case in which temperature of the focus adjusting element is a predetermined temperature.

14. An imaging device comprising:
a detector operable to repeatedly perform a series of operations of generating evaluation values to evaluate a degree of focusing for each position of a lens after driving the lens based on a drive instruction toward one end part in a drive range of the lens, and detect an evaluation value of a first position that is immediately adjacent or adjacent across a predetermined number of positions to a position of an evaluation value of a highest degree of focusing, the detected evaluation value serving as a basis of driving of the lens; and a drive controller operable to drive the lens to a first position corresponding to the detected evaluation value based on a distance between the first position and one end part of two end parts in the drive range of the lens after driving the lens to the one end part, if the drive controller fails to drive the lens to a second position corresponding to a degree of focusing not smaller than the detected evaluation value by repeating the series of operations for a predetermined number of times toward the other end part in the drive range of the lens, wherein the drive instruction relating to the series of operations repeatedly performed toward the one end part is a drive instruction for driving a focus adjusting element a predetermined number of times, and the drive controller drives the lens one time toward the other end part based on the drive instruction for driving the focus adjusting element a smaller number of times than the predetermined number of times, after repeatedly performing the series of operations toward the other end part.

15. An imaging method comprising:
repeatedly performing a series of operations of generating evaluation values to evaluate a degree of focusing for each position of a lens after driving the lens based on a drive instruction by a focus adjusting element that changes or adjusts a focal length depending on supplied power toward one end part in a drive range of the lens, and detecting the evaluation value of a first position that is closer to the one end part than a position of an evaluation value of a highest degree of focusing, wherein the first position corresponding to the detected evaluation value is immediately adjacent or adjacent across a predetermined number of positions to the position of the evaluation value of the highest degree of focusing; and
causing the series of operations to be repeatedly carried out toward the other end part in the drive range of the lens, and driving the lens to a second position corresponding to a degree of focusing not smaller than the detected evaluation value based on the detected evaluation value,
wherein the drive instruction relating to the series of operations repeatedly performed toward the one end part is a drive instruction for driving the focus adjusting element a predetermined number of times, and a drive controller drives the lens one time toward the other end part based on the drive instruction for driving the focus adjusting element a smaller number of times than the predetermined number of times, after repeatedly performing the series of operations toward the other end part.

16. A non-transitory computer-readable storage medium having stored thereon, a computer program having at least one code section for communication, the at least one code section being executable by a computer for causing the computer to perform steps comprising:
repeatedly performing a series of operations of generating evaluation values to evaluate a degree of focusing for each position of a lens after driving the lens based on a drive instruction by a focus adjusting element that changes or adjusts a focal length depending on supplied power toward one end part in a drive range of the lens, and detecting the evaluation value of a position that is closer to the one end part than a position of an evaluation value of a highest degree of focusing, wherein the position of the detected evaluation value is immediately adjacent or adjacent across a predetermined number of positions to the position of the evaluation value of the highest degree of focusing; and
causing the series of operations to be repeatedly carried out toward the other end part in the drive range of the lens, and driving the lens to a position of a degree of focusing not smaller than the detected evaluation value based on the detected evaluation value,
wherein the drive instruction relating to the series of operations repeatedly performed toward the one end part is a drive instruction for driving the focus adjusting element a predetermined number of times, and a drive controller drives the lens one time toward the other end part based on the drive instruction for driving the focus adjusting element a smaller number of times than the predetermined number of times, after repeatedly performing the series of operations toward the other end part.

17. An imaging device comprising:
a detector configured to repeatedly carry out a series of operations of generating evaluation values to evaluate a degree of focusing for each position of a lens after driving the lens based on a drive instruction by a focus adjusting element that changes or adjusts a focal length depending on supplied power toward one end part in a drive range of the lens, the detector detecting the evaluation value of a position that is closer to the end part than a position of an evaluation value of a highest degree of focusing and is immediately adjacent or adjacent across a predetermined number of positions to the position of the evaluation value of the highest degree of focusing; and
a drive controller configured to cause the series of operations be repeatedly carried out toward the other end part in the drive range of the lens, and drive the lens to a position of a degree of focusing not smaller than the detected evaluation value based on the detected evaluation value,
wherein the drive controller calculates a distance between a position at which repetition of the series of operations of generating the evaluation value is ended and the position of the detected evaluation value and drives the lens by the calculated distance based on error information relating to an error from an amount of driving of the lens by the focus adjusting element and the calculated distance, before repeatedly carrying out the series of operations in a direction opposite to a direction of the driving,
wherein the error information is first information relating to an error in a case in which the amount of driving of the lens by one time of driving by the focus adjusting element is maximum due to posture difference of the imaging device, and second information relating to an error in a case in which the amount of driving of the lens by one time of driving by the focus adjusting element is minimum due to the posture difference, and the drive controller calculates the number of times the lens has to be driven by the focus adjusting element in a case in which the amount of driving relating to driving of the lens toward the one end part is maximum and the amount of driving relating to driving of the lens toward the other end part is minimum, based on the calculated distance, the first information, and the second information, and drives the lens the calculated number of times.

18. An imaging device comprising:
a detector configured to repeatedly carry out a series of operations of generating evaluation values to evaluate a degree of focusing for each position of a lens after driving the lens based on a drive instruction by a focus adjusting element that changes or adjusts a focal length depending on supplied power toward one end part in a drive range of the lens, the detector detecting the evaluation value of a position that is closer to the end part than a position of an evaluation value of a highest degree of focusing and is immediately adjacent or adjacent across a predetermined number of positions to the position of the evaluation value of the highest degree of focusing; and
a drive controller configured to cause the series of operations be repeatedly carried out toward the other end part in the drive range of the lens, and drive the lens to a position of a degree of focusing not smaller than the detected evaluation value based on the detected evaluation value,
wherein the drive controller considers posture of the imaging device in a specific direction that corresponds with a horizontal plane, and estimates information indicating the number of times of driving by the focus adjusting element equivalent to distance from one end part of two end parts in the drive range of the lens as a position at which the lens exists based on the amount of driving of the lens by one time of drive operation by the focus adjusting element, in a case in which the focus adjusting element is at a predetermined temperature.

* * * * *